(12) United States Patent
Kunishige et al.

(10) Patent No.: US 8,593,544 B2
(45) Date of Patent: Nov. 26, 2013

(54) IMAGING APPARATUS, IMAGING METHOD, AND COMPUTER-READABLE RECORDING MEDIUM

(75) Inventors: Keiji Kunishige, Hachioji (JP); Manabu Ichikawa, Hachioji (JP)

(73) Assignee: Olympus Imaging Corp. (JP)

( * ) Notice: Subject to any disclaimer, the term of this patent is extended or adjusted under 35 U.S.C. 154(b) by 90 days.

(21) Appl. No.: 13/294,527

(22) Filed: Nov. 11, 2011

(65) Prior Publication Data

US 2012/0120278 A1    May 17, 2012

(30) Foreign Application Priority Data

Nov. 11, 2010 (JP) .................. 2010-253258
Nov. 29, 2010 (JP) .................. 2010-265770

(51) Int. Cl.
*H04N 5/262* (2006.01)

(52) U.S. Cl.
USPC ............ 348/239; 348/222.1; 348/333.01

(58) Field of Classification Search
USPC ............................ 348/222.1, 239, 333.01
See application file for complete search history.

(56) References Cited

U.S. PATENT DOCUMENTS

| | | | | |
|---|---|---|---|---|
| 8,085,318 B2 * | 12/2011 | Ciudad et al. | ............... | 348/239 |
| 8,203,626 B2 * | 6/2012 | Ota | ............... | 348/239 |
| 8,384,785 B2 * | 2/2013 | Solomon | ............... | 348/207.1 |
| 2002/0105589 A1 * | 8/2002 | Brandenberger et al. | ..... | 348/360 |
| 2006/0050151 A1 * | 3/2006 | Fujinawa | ............... | 348/207.99 |

FOREIGN PATENT DOCUMENTS

| | | |
|---|---|---|
| JP | 2003-290546 | 10/2003 |
| JP | 2005-347886 | 12/2005 |
| JP | 2006-129065 | 5/2006 |
| JP | 2006-217505 | 8/2006 |
| JP | 2007-116635 | 5/2007 |
| JP | 2010-087940 | 4/2010 |
| JP | 2010-130388 | 6/2010 |

* cited by examiner

*Primary Examiner* — Gevell Selby
(74) *Attorney, Agent, or Firm* — Volpe and Koenig, P.C.

(57) ABSTRACT

An imaging apparatus including an imaging unit that captures images of a photographic subject and continuously generates electronic image data; a display unit that displays, at a predetermined display frame rate, images corresponding to the image data generated by the imaging unit; an image processing unit that either performs a first-type special effect operation that can be displayed at the predetermined display frame rate or performs a second-type special effect operation that can be displayed at a faster display frame rate than the predetermined display frame rate; an operation input unit that receives input of a change instruction signal that provides an instruction for changing a combination of image processing operations during a special effect operation performed by the image processing unit; and a control unit that instructs the image processing unit to switch the special effect operation from the first-type special effect operation to the second-type special effect operation.

18 Claims, 25 Drawing Sheets

FIG.6

| SPECIAL EFFECT (ART FILTER) | | OPERATION CONTENTS (T1) | |
|---|---|---|---|
| | | FIRST-TYPE SPECIAL EFFECT OPERATION | SECOND-TYPE SPECIAL EFFECT OPERATION |
| Art1 | FANTASTIC FOCUS | 1. TONE CURVING | 1. TONE CURVING |
| | | 2. AIRBRUSHING | 2. AIRBRUSHING |
| | | 3. IMAGE SYNTHESIS | × |
| Art2 | TOY PHOTO | 1. WHITE BALANCE PROCESSING | 1. WHITE BALANCE PROCESSING |
| | | 2. CONTRAST PROCESSING | 2. CONTRAST PROCESSING |
| | | 3. SHADING PROCESSING | × |
| Art3 | ROUGH MONOCHROME | 1. EDGE REINFORCEMENT | 1. EDGE REINFORCEMENT |
| | | 2. LEVEL CORRECTION/ OPTIMIZATION | × |
| | | 3. NOISE PATTERN GENERATION AND IMAGE SYNTHESIS | × |
| | | 4. CONTRAST PROCESSING | 4. CONTRAST PROCESSING |
| Art4 | DIORAMA | 1. HUE/COLOR SATURATION PROCESSING | 1. HUE/COLOR SATURATION PROCESSING |
| | | 2. CONTRAST PROCESSING | 2. CONTRAST PROCESSING |
| | | 3. AIRBRUSHING (THRICE) | 3. AIRBRUSHING (ONCE) |
| | | 4. IMAGE SYNTHESIS (THRICE) | 4. IMAGE SYNTHESIS (ONCE) |
| Art5 | | 1. LEVEL CORRECTION/ OPTIMIZATION | × |
| | | 2. TONE CURVING | × |
| | | 3. HUE/COLOR SATURATION SEPIA CONVERSION | 3. HUE/COLOR SATURATION SEPIA CONVERSION |
| | | 4. SHADOW HUE ROTATION | × |

FIG.7

| SUPPLEMENTARY SPECIAL EFFECT (ART EFFECT) | | OPERATION CONTENTS (T2) | |
|---|---|---|---|
| | | FIRST-TYPE SUPPLEMENTARY SPECIAL EFFECT OPERATION | SECOND-TYPE SUPPLEMENTARY SPECIAL EFFECT OPERATION |
| Effect1 | WHITEOUT EFFECT | 1. WHITEOUT PROCESSING | 1. WHITEOUT PROCESSING |
| Effect2 | SHADING EFFECT | 1. SHADING PROCESSING | 1. PINHOLE IMAGE SYNTHESIS |
| Effect3 | STARLIGHT EFFECT | 1. BRIGHT SPOT DETECTION | × |
| | | 2. STRIATION DRAWING | × |
| Effect4 | ART FRAME EFFECT | 1. FRAME IMAGE SYNTHESIS | |
| Effect5 | SOFT FOCUS EFFECT | 1. AIRBRUSHING | 1. AIRBRUSHING |
| | | 2. IMAGE SYNTHESIS | × |

FIG.12

| SPECIAL EFFECT (ART FILTER) | | OPERATION CONTENTS | |
|---|---|---|---|
| | | FIRST-TYPE SPECIAL EFFECT OPERATION | SECOND-TYPE SPECIAL EFFECT OPERATION |
| Art1 | FANTASTIC FOCUS | 1. TONE CURVING | NATURAL |
| | | 2. AIRBRUSHING | |
| | | 3. IMAGE SYNTHESIS | |
| Art2 | TOY PHOTO | 1. WHITE BALANCE PROCESSING | VIVID |
| | | 2. CONTRAST PROCESSING | |
| | | 3. SHADING PROCESSING | |
| Art3 | ROUGH MONOCHROME | 1. EDGE REINFORCEMENT | MONOTONE |
| | | 2. LEVEL CORRECTION/ OPTIMIZATION | |
| | | 3. NOISE PATTERN GENERATION AND IMAGE SYNTHESIS | |
| | | 4. CONTRAST PROCESSING | |
| Art4 | DIORAMA | 1. HUE/COLOR SATURATION PROCESSING | VIVID |
| | | 2. CONTRAST PROCESSING | |
| | | 3. AIRBRUSHING (THRICE) | |
| | | 4. IMAGE SYNTHESIS (THRICE) | |
| Art5 | GENTLE SEPIA | 1. LEVEL CORRECTION/ OPTIMIZATION | |
| | | 2. TONE CURVING | |
| | | 3. HUE/COLOR SATURATION SEPIA CONVERSION | |
| | | 4. SHADOW HUE ROTATION | |

FIG.13

| SUPPLEMENTARY SPECIAL EFFECT (ART EFFECT) | | OPERATION CONTENTS T4 | |
|---|---|---|---|
| | | FIRST-TYPE SUPPLEMENTARY SPECIAL EFFECT OPERATION | SECOND-TYPE SUPPLEMENTARY SPECIAL EFFECT OPERATION |
| Effect1 | WHITEOUT EFFECT | 1. WHITEOUT PROCESSING | × |
| Effect2 | SHADING EFFECT | 1. SHADING PROCESSING | × |
| Effect3 | STARLIGHT EFFECT | 1. BRIGHT SPOT DETECTION | × |
| | | 2. STRIATION DRAWING | × |
| Effect4 | ART FRAME EFFECT | 1. FRAME IMAGE SYNTHESIS | |
| Effect5 | SOFT FOCUS EFFECT | 1. AIRBRUSHING | × |
| | | 2. IMAGE SYNTHESIS | × |

FIG.17

|  |  | RECORDING FRAME RATE | REPLAYING FRAME RATE | APPLICABLE VIDEO FILE FORMATS T11 |
|---|---|---|---|---|
| Art1 | FANTASTIC FOCUS | 24 fps | 24 fps | AVCHD, |
| Art2 | TOY PHOTO | 2 fps | 2 fps | AVI |
| Art3 | ROUGH MONOCHROME | 6 fps | 6 fps | AVI |
| Art4 | DIORAMA | 2 fps | 15 fps | AVI |
| Art5 | GENTLE SEPIA | 24 fps | 24 fps | AVCHD, AVI |

# IMAGING APPARATUS, IMAGING METHOD, AND COMPUTER-READABLE RECORDING MEDIUM

CROSS REFERENCE TO RELATED APPLICATION(S)

This application is based upon and claims the benefit of priority from Japanese Patent Application No. 2010-253258, filed on Nov. 11, 2010 and Japanese Patent Application No. 2010-265770, filed on Nov. 29, 2010, the entire contents of which are incorporated herein by reference.

FIELD OF INVENTION

The present invention relates to an imaging apparatus, an imaging method, and a computer-readable recording medium for taking images of a photographic subject and generating electronic image data.

BACKGROUND

In recent years, in imaging apparatuses such as digital cameras or digital video cameras, a known technology for producing special effects on image data obtained by taking images of photographic subjects is implemented so as to cater to various demands from consumers. For example, a technology is known that enables recording of special effect image data, which is obtained by performing special effects such as the wipe effect or the sepia effect on image data obtained by taking images of photographic subjects (see Japanese Laid-open Patent Publication No. 2005-347886). In this technology, images created by implementing special effects, which are selected by the user by means of operating an effect switch provided to select special effects, are displayed as part of an image that is being displayed on a display monitor. That enables the user to select the intended special effects without difficulty.

Moreover, imaging apparatuses are known in which, depending on the status of a release switch, the image data that is continuously generated by an image sensor such as a charge-coupled device (CCD) is subjected to a change in the imaging frame rate; and the time difference between the time at which the image sensor generates image data and the time at which a display monitor displays a live view image is shortened. That enables achieving reduction in the possibility of the user missing the photo opportunity (for example, Japanese Laid-open Patent Publication No. 2006-217505 and Japanese Laid-open Patent Publication No. 2006-129065).

SUMMARY

An imaging apparatus according to an aspect of the present invention includes: an imaging unit that captures images of a photographic subject and continuously generates electronic image data; a display unit that displays, at a predetermined display frame rate, images corresponding to the image data generated by the imaging unit; an image processing unit that either performs, with respect to the images, a first-type special effect operation that can be displayed at the predetermined display frame rate or performs, with respect to the images, a second-type special effect operation that can be displayed at a faster display frame rate than the predetermined display frame rate; an operation input unit that receives input of a change instruction signal that provides an instruction for changing a combination of image processing operations during a special effect operation performed by the image processing unit; and a control unit that, when an input of the change instruction signal is received by the operation input unit, instructs the image processing unit to switch the special effect operation from the first-type special effect operation to the second-type special effect operation.

An imaging method according to another aspect of the present invention implemented in an imaging apparatus that captures images of a photographic subject and continuously generates electronic image data, that is capable of displaying, at a predetermined display frame rate, images corresponding to the image data generated by the imaging unit, and that is capable of performing a plurality of special effect operations in which special effects are produced in the images by a combination of a plurality of image processing operations, the imaging method includes: receiving input of a change instruction signal that provides an instruction for changing a combination of image processing operations during a special effect operations; and switching, in response to receiving an input of the change instruction signal, the special effect operation from a first-type special effect operation that can be displayed at the predetermined display frame rate to a second-type special effect operation that can be displayed at a faster display frame rate than the predetermined display frame rate.

An imaging method according to still another aspect of the present invention implemented in an imaging apparatus that captures images of a photographic subject and continuously generates electronic image data, that is capable of displaying, at a predetermined display frame rate, images corresponding to the image data generated by the imaging unit, and that is capable of performing a plurality of special effect operations in which special effects are produced in the images by a combination of a plurality of image processing operations, the imaging method includes: performing a special effect operation on the image data; recording in a chronological order the image data that has been subjected to the special effect operation in a predetermined video recording mode; receiving input of a setting instruction signal giving an instruction about settings contents of the special effect operation; setting the special effect operation according to the setting instruction signal; and changing, depending on the special effect operation, the video recording mode of the image data to be recorded.

A non-transitory computer-readable storage medium according to still another aspect of the present invention has an executable program stored thereon, wherein the program instructs a processor, which captures images of a photographic subject and continuously generates electronic image data, which is capable of displaying, at a predetermined display frame rate, images corresponding to the image data generated by the imaging unit, and which is capable of performing a plurality of special effect operations in which special effects are produced in the images by a combination of a plurality of image processing operations, to perform: receiving input of a change instruction signal that provides an instruction for changing a combination of image processing operations during the special effect operation; and switching, in response to receiving an input of the change instruction signal, the special effect operation from a first-type special effect operation that can be displayed at the predetermined display frame rate to a second-type special effect operation that can be displayed at a faster display frame rate than the predetermined display frame rate.

A non-transitory computer-readable storage medium according to still another aspect of the present invention has an executable program stored thereon, wherein the program instructs a processor, which captures images of a photographic subject and continuously generates electronic image data, which is capable of displaying, at a predetermined display frame rate, images corresponding to the image data generated by the imaging unit, and which is capable of performing a plurality of special effect operations in which special effects are produced in the images by a combination of a plurality of image processing operations to perform: performing a special effect operation on the image data; recording in a chronological order the image data that has been subjected to the special effect operation in a predetermined video recording mode; receiving input of a setting instruction signal giving an instruction about settings contents of the special effect operation; setting the special effect operation according to the setting instruction signal; and changing, depending on the special effect operation, the video recording mode of the image data to be recorded.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWING(S)

FIG. 6 is a diagram of an example of a special-effect-operation information table stored in a special-effect-operation information storing unit of the imaging apparatus according to the first embodiment;

FIG. 7 is a diagram of an example of a supplementary-special-effect-operation information table stored in a supplementary-special-effect-operation information storing unit of the imaging apparatus according to the first embodiment;

FIG. 12 is a diagram illustrating an example of a special-effect-operation information table stored in the special-effect-operation information storing unit of the imaging apparatus according to the second embodiment;

FIG. 13 is a diagram illustrating an example of a supplementary-special-effect-operation information table stored in the supplementary-special-effect-operation information storing unit of the imaging apparatus according to the second embodiment;

FIG. 17 is a diagram illustrating a video-recording-mode information table stored in a video-recording-mode information storing unit of the imaging apparatus according to the fourth embodiment;

Figure 24:
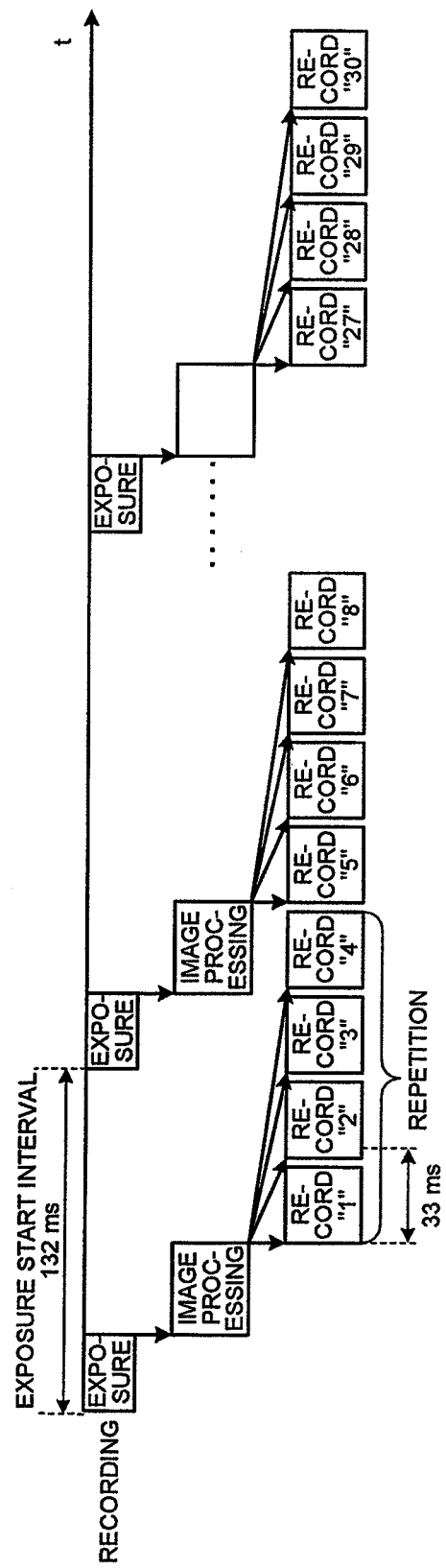
Figure 25:
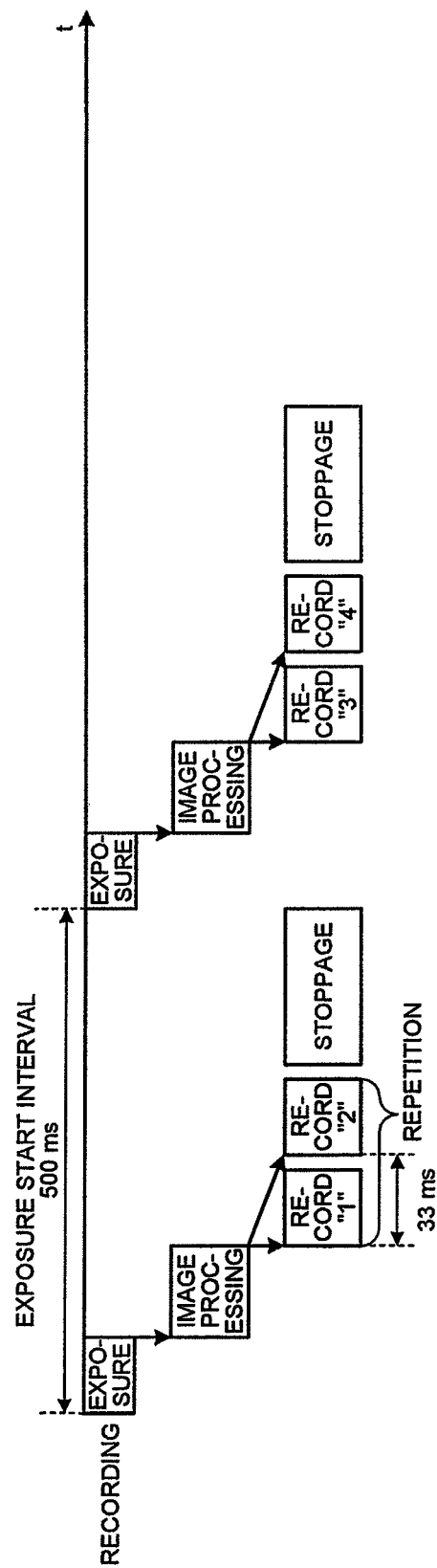

FIG. 24 is a time chart illustrating a conventional recording method for recording image data at the time of shooting frame dropping videos in the AVCHD video file format; and FIG. 25 is a time chart illustrating a recording method of recording image data, which has been subjected to the special effect operation by an image processing unit, at the time of performing video shooting in the AVCHD video file format according to the fifth embodiment.

DETAILED DESCRIPTION OF THE PREFERRED EMBODIMENT(S)

First Embodiment

Figure 1:
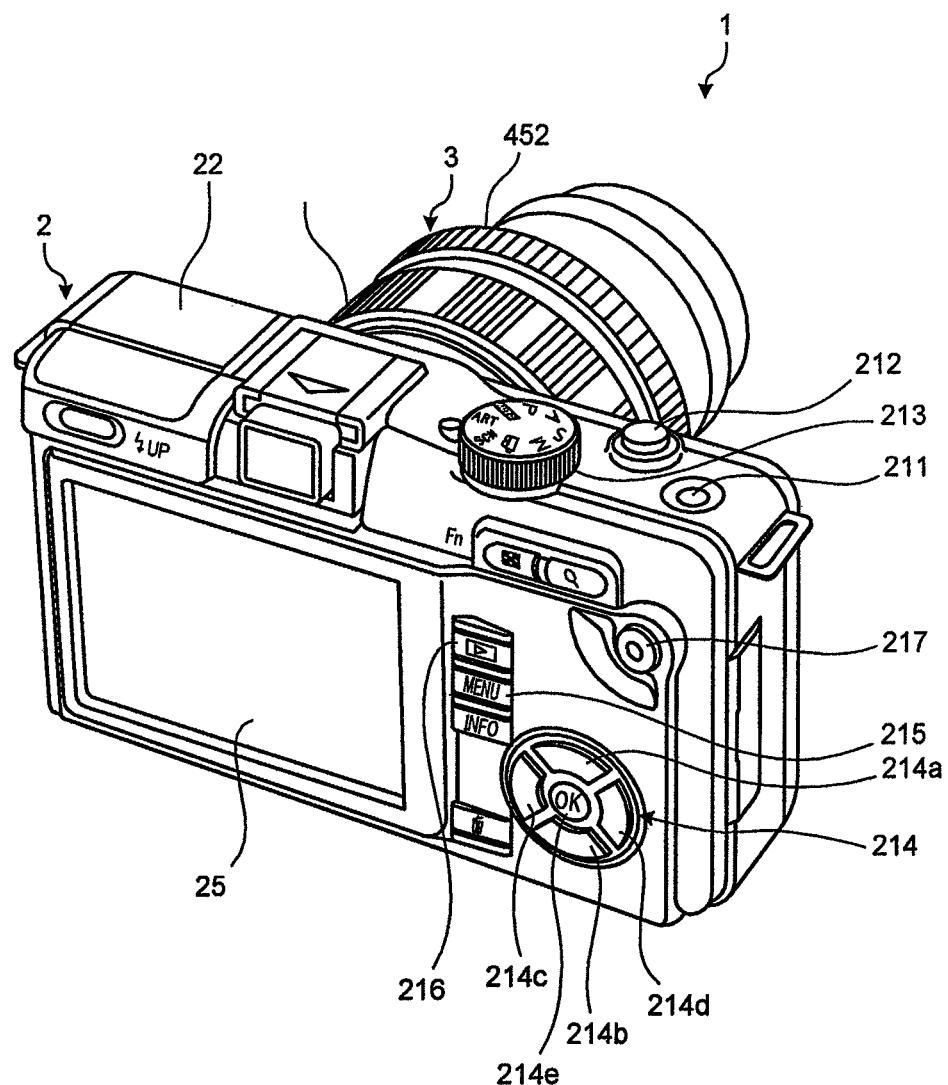
FIG. 1 is a perspective view of a configuration of an imaging apparatus, when seen from the side facing the photographer, according to a first embodiment of the present embodiment.
Figure 2:
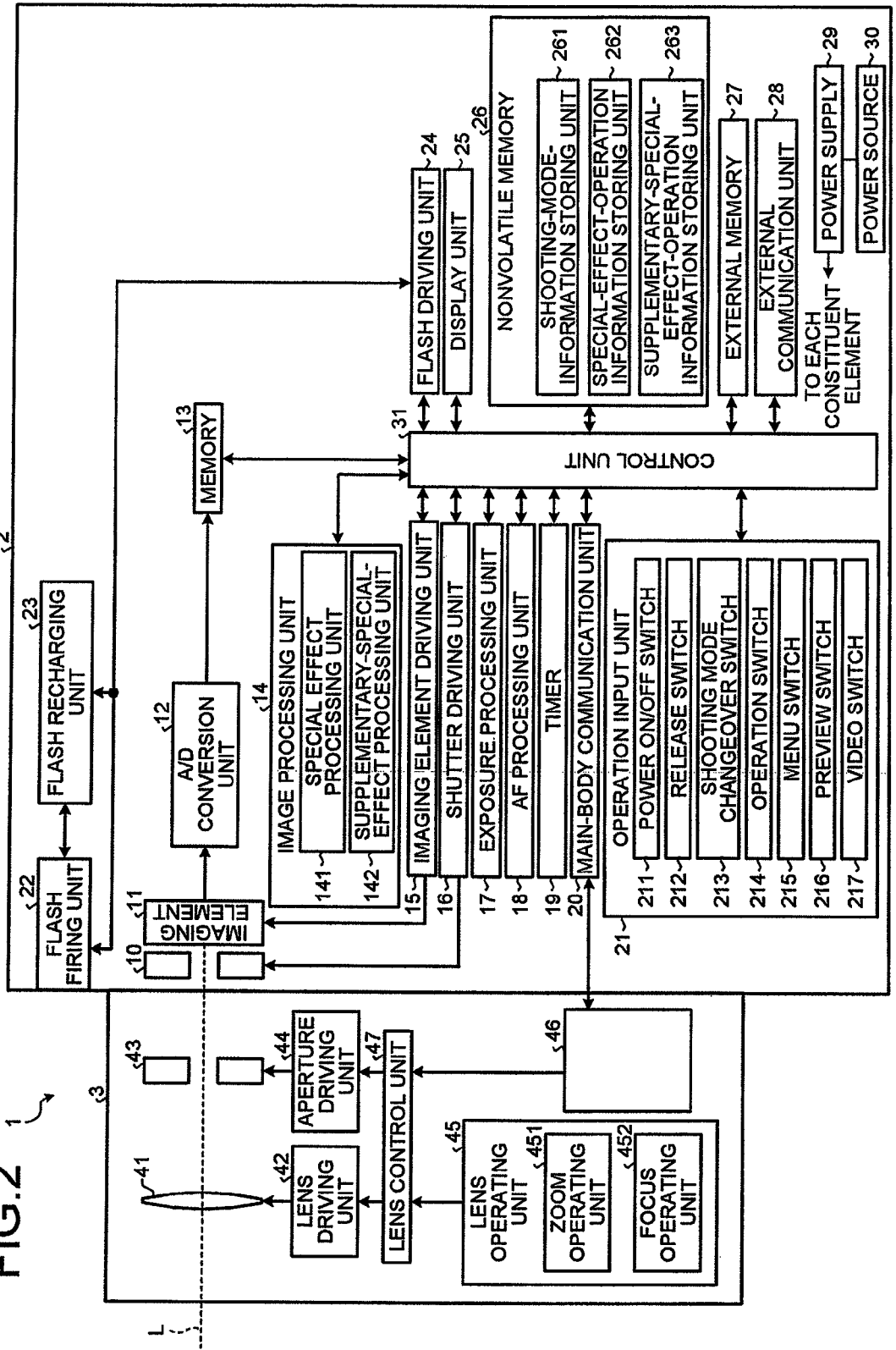
FIG. 2 is a block diagram of a configuration of the imaging apparatus according to the first embodiment.

FIG. 1 is a perspective view of a configuration of an imaging apparatus, when seen from the side facing the photographer (i.e., when seen from the rear side), according to a first embodiment of the present embodiment. FIG. 2 is a block diagram of a configuration of the imaging apparatus according to the first embodiment of the present invention. An imaging apparatus 1 illustrated in FIGS. 1 and 2 is a digital single-lens reflex camera including a main body 2 and a lens unit 3 that is detachably attached to the main body 2.

As illustrated in FIGS. 1 and 2, the main body 2 includes a shutter 10, an imaging element 11, an analog-to-digital (A/D) conversion unit 12, a memory 13, an image processing unit 14, an imaging element driving unit 15, a shutter driving unit 16, an exposure processing unit 17, an automatic focus (AF)

processing unit 18, a timer 19, a main-body communication unit 20, an operation input unit 21, a flash firing unit 22, a flash recharging unit 23, a flash driving unit 24, a display unit 25, a nonvolatile memory 26, an external memory 27, an external communication unit 28, a power supply 29, a power source 30, and a control unit 31.

The shutter 10 sets the imaging element 11 to either an exposed state or a lightproof state. The shutter driving unit 16 is configured with a stepping motor and drives the shutter 10 according to release signals.

The imaging element 11 is configured with a charge-coupled device (CCD) or a complementary metal oxide semiconductor (CMOS) that receives light converged by the lens unit 3 and converts the received light into electric signals. The imaging element driving unit 15 instructs the imaging element 11 to output the image data (analog signals) to the A/D conversion unit 12 at predetermined timings.

Herein, the A/D conversion unit 12 generates digital image data by performing analog-to-digital conversion of the analog signals output by the imaging element 11 and stores the digital image data in the memory 13.

Herein, the memory 13 is configured with a synchronous dynamic random access memory (SDRAM) and is used to temporarily store the image data output by the A/D conversion unit 12 as well as the information being processed in the imaging apparatus 1. More particularly, the memory 13 temporarily stores therein the image data that is sequentially output on a frame-by-frame basis by the imaging element 11.

The image processing unit 14 obtains the image data stored in the memory 13 via the control unit 31, performs a variety of image processing on that image data, and outputs the processed image data to the memory 13. More particularly, the image processing unit 14 performs image processing operations such as edge reinforcement, color correction, and gamma (γ) correction. Moreover, the image processing unit 14 includes a special effect processing unit 141, which performs a special effect operation in which special effects are produced in images by means of performing a combination of a plurality of image processing operations; and includes a supplementary-special-effect processing unit 142, which performs a supplementary special effect operation in which the image data that has been subjected to the special effect operation is further subjected to different image processing operations. The special effect processing unit 141 performs a special effect operation in which special effects are produced in images by means of performing a combination of a plurality of image processing operations. Such a special effect operation can be, for example, a combination of tone curving, airbrushing, and image synthesis. The supplementary-special-effect processing unit 142 performs a supplementary special effect operation in which the image data that has been subjected to the special effect operation is further subjected to different image processing operations. For example, the supplementary-special-effect processing unit 142 adds supplementary special effects by performing a whiteout effect operation or the shading effect operation.

Based on the image data stored in the memory 13 via the control unit 31, the exposure processing unit 17 controls the automatic exposure of the imaging apparatus 1 by means of determining conditions, such as the aperture setting value and the shutter speed, while performing still image shooting or performing video shooting.

Based on the image data stored in the memory 13 via the control unit 31, the AF processing unit 18 performs auto focus control of the imaging apparatus 1. For example, based on the contrast levels in the image data, the AF processing unit 18 drives the lens unit 3 in such a way that the photographic subject to be photographed has the maximum sharpness.

The timer 19 measures time and has a function of determining the shooting date and time. With the purpose of adding date-time data to image data obtained by means of taking images, the timer 19 outputs date-time data to the control unit 31.

The main-body communication unit 20 is a communication interface for performing communication with the lens unit 3 installed in the main body 2. Meanwhile, the main-body communication unit 20 can also be configured to supply power from the power source 30 to the lens unit 3.

The operation input unit 21 includes a power ON/OFF switch 211 that switches the imaging apparatus 1 between a power ON state and a power OFF state; includes a release switch 212 for inputting release signals that provide instructions for shooting; includes a shooting mode changeover switch 213 for inputting changeover signals that provide instructions for switching to various shooting modes set in the imaging apparatus 1; includes an operation switch 214 for inputting instruction signals that provide instructions regarding selection or determination of various settings in the imaging apparatus 1; includes a menu switch 215 for inputting instruction signals that provide instructions regarding the display on an operation menu screen set in the imaging apparatus 1; a preview switch 216 for inputting instruction signals that provide instructions regarding the REC view display of image data of captured images; and includes a video switch 217 for inputting video release signals that provide instructions regarding video shooting. The release switch 212 is configured to be protrudable/retractable in response to an external pressing force. When half-pressed, the release switch 212 receives input of a first release signal that provides an instruction regarding a shooting preparation operation; and when fully pressed, the release switch 212 receives input of a second release signal that provides an instruction regarding still image shooting. The operation switch 214 includes directional buttons 214a to 214d corresponding to the upward, downward, left, and right directions for performing selection setting on the menu screen. In addition, the operation switch 214 includes a decision button 214e (OK button) for finalizing the operations selected on the menu screen using the directional buttons 214a to 214d (see FIG. 1). Meanwhile, the operation switch 214 can also be configured with a dial switch.

The flash firing unit 22 is configured with a xenon lamp or with light emitting diodes (LEDs). The flash firing unit 22 emits stroboscopic light that serves as fill light emitted toward the field of vision to be captured. The flash recharging unit 23 recharges by receiving power supply from the power source 30 and raising the voltage. The flash driving unit 24 drives the flash firing unit 22 by applying the voltage that has been raised by the flash recharging unit 23 to the flash firing unit 22.

The display unit 25 is configured with a display panel made of liquid crystals or made of organic electro luminescence (EL). The display unit 25 displays images, which correspond to the image data generated by the imaging element 11; or displays images, which correspond to the image data that has been subjected to the special effect operation by the image processing unit 14, at a predetermined display frame rate of, for example, 600 frames per second (fps). Besides, the display unit 25 displays the operation information of the imaging apparatus 1 or the information related to shooting when necessary.

The nonvolatile memory 26 is configured with a flash memory and is used in storing various programs for operating the imaging apparatus 1, in storing an imaging program according to the first embodiment, and in storing a variety of data or various parameters used while executing the programs. Moreover, the nonvolatile memory 26 includes a shooting-mode-information storing unit 261 for storing the information related to various shooting modes implemented in the imaging apparatus 1; includes a special-effect-operation information storing unit 262 for storing the information related to the special effect operation performed by the image processing unit 14; and includes a supplementary-special-effect-operation information storing unit 263 for storing the information related to the supplementary special effect operation performed by the image processing unit 14. Besides, the nonvolatile memory 26 can also be used to store the information related to the lens characteristics depending on the type of the lens unit 3 that is detachably attachable to the main body 2.

The external memory 27 is configured with a recording medium such as a memory card that is attached to the imaging apparatus 1 from outside. On the one hand, upon being attached to the imaging apparatus 1, the external memory 27 is used in storing the information such as the image data; and, on the other hand, under the control of the control unit 31, the external memory 27 outputs a variety of the stored information to the display unit 25, the image processing unit 14, and the nonvolatile memory 26.

The external communication unit 28 functions as a communication interface and performs two-way communication with external processing devices, such as servers (not illustrated) or personal computers (not illustrated), via a network. By means of communicating with external processing devices, the external communication unit 28 obtains various programs to be executed the imaging apparatus 1 and obtains data related to the special effect operation and the supplementary special effect operation to be performed in the imaging apparatus, and outputs the obtained data to the control unit 31. Meanwhile, the external communication unit 28 is connected to the network via a wired local area network (LAN) or a wireless LAN.

The power supply 29 supplies power from the power source 30 to each constituent element of the imaging apparatus 1. The power source 30 is configured with a battery that is detachably attached to the imaging apparatus 1. Meanwhile, the power supply 29 can also be configured to supply power from an external power source (not illustrated) to the imaging apparatus 1.

The control unit 31 is configured with a central processing unit (CPU), which reads programs from the nonvolatile memory 26 in accordance with the operation signals or the instruction signals received from the operation input unit 21 and executes those programs, and comprehensively controls the operations of the imaging apparatus 1 by means of forwarding instructions or data to each constituent element of the imaging apparatus 1. When a change instruction signal is input via the operation input unit 21 as an instruction for changing the image processing during the special effect operation performed by the image processing unit 14, the control unit 31 switches the special effect operation performed on the image data by the image processing unit 14 from a first-type special effect operation, in which special effects are produced with a combination of a plurality of image processing operations that can be displayed by the display unit 25 at a predetermined display frame rate, into a second-type special effect operation, in which special effects are produced with a combination of a plurality of image processing operations that can be displayed by the display unit 25 at a faster display frame rate than the predetermined display frame rate. For example, the control unit 31 switches the special effect operation performed on the image data by the image processing unit 14 from first-type special effect operation, in which the special effect operations performed on the image data by the image processing unit 14 are displayable at the display frame rate 60 fps, into second-type special effect operation, in which the special effect operations are displayable at the display frame rate 120 fps.

The lens unit 3 includes an optical system 41, a lens driving unit 42, an aperture 43, an aperture driving unit 44, a lens operating unit 45, a lens communication unit 46, and a lens control unit 47.

The optical system 41 is configured with one or more lenses. The optical system 41 collects light from a predetermined field of vision and performs optical zooming for changing the angle of view. The lens driving unit 42 is configured with a direct-current (DC) motor, and moves the lenses of the optical system 41 on an optical axis L so as to change the point of focus or the focal length of the optical system 41.

The aperture 43 performs exposure adjustment by controlling the amount of incident light collected by the optical system 41. The aperture driving unit 44 is configured with a stepping motor and drives the aperture 43.

The lens operating unit 45 includes a zoom operating unit 451 and a focus operating unit 452. As illustrated in FIG. 1, the zoom operating unit 451 is a zoom ring installed around the lens barrel of the lens unit 3. The zoom operating unit 451 receives input of an operation signal indicating the start of an operation of an optical zoom in the lens unit 3. As illustrated in FIG. 1, the focus operating unit 452 is a focus ring installed around the lens barrel of the lens unit 3. The focus operating unit 452 receives input of an operation signal indicating the start of an operation of the point of focus or the focal length in the lens unit 3.

The lens communication unit 46 is a communication interface for performing two-way communication with the main body 2 when the lens unit 3 is attached to the main body 2.

The lens control unit 47 is configured with a CPU and controls the operations of the lens unit 3 according to the operation signals received from the lens operating unit 45 or the instruction signals received from the main body 2. More particularly, the lens control unit 47 performs focusing and zooming by driving the lens driving unit 42 according to the operation signals from the lens operating unit 45 and makes changes in the aperture value by driving the aperture driving unit 44. Meanwhile, when the lens unit 3 is attached to the main body 2, the lens control unit 47 can be configured to send, to the main body 2, the information regarding the point of focus, the information regarding the focal length, and the unique information for identifying the lens unit 3.

Given below is the explanation of a method for setting a special effect shooting mode (art filter shooting mode) in which the special effect operation is performed on the image data of captured images in the imaging apparatus 1 having the abovementioned configuration. Although the following explanation is given only regarding the method for setting the special effect shooting mode, the imaging apparatus 1 has a plurality of shooting modes such as a shooting-scene auto-detection shooting mode and a manual shooting mode.

Firstly, when the user operates the power ON/OFF switch 211 to switch ON the imaging apparatus 1, the control unit 31 determines whether or not the shooting mode of the imaging apparatus 1 is set to the special effect shooting mode. More particularly, the control unit 31 determines whether or not the shooting mode changeover switch 213 is set to the special effect shooting mode (ART) (see FIG. 1). If the shooting mode of the imaging apparatus 1 is not set to the special effect shooting mode, then the control unit 31 displays an operation menu screen corresponding to another shooting mode or displays a live view image on the display unit 25. In contrast, if the shooting mode of the imaging apparatus 1 is set to the special effect shooting mode, then the control unit 31 displays a special-effect-shooting operation menu screen corresponding to the special effect shooting effect on the display unit 25.

Figure 3:
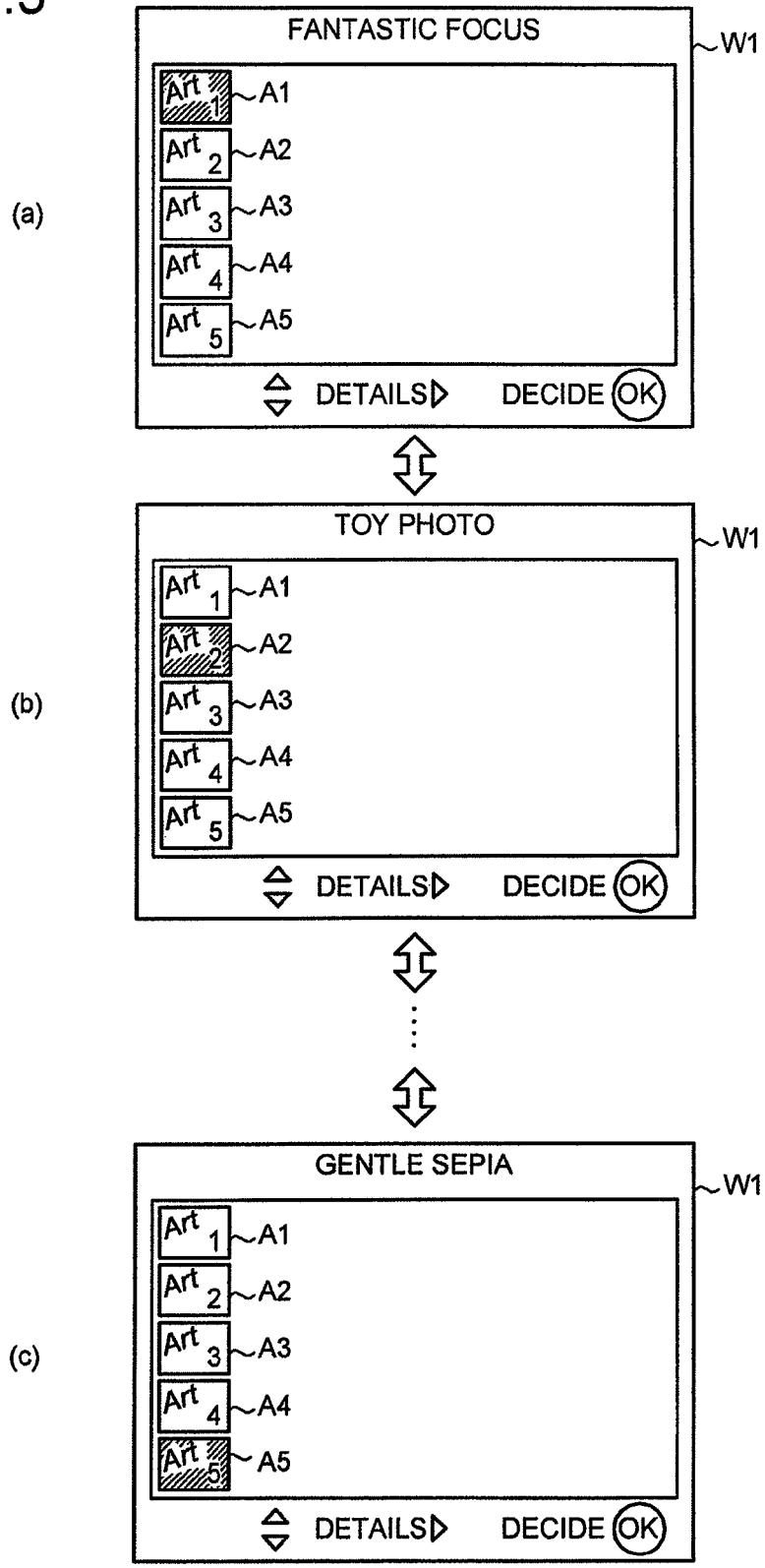
FIG. 3 is a diagram illustrating an example of transition of special-effect-shooting operation menu screens displayed by a display unit during a special effect shooting mode when the imaging apparatus according to the first embodiment is set to a special effect shooting mode.

FIG. 3 is a diagram illustrating an example of transition of special-effect-shooting operation menu screens displayed by the display unit 25 during the special effect shooting mode when the imaging apparatus 1 is set to the special effect shooting mode. As illustrated in FIG. 3, when the imaging apparatus 1 is set to the special effect shooting mode, the control unit 31 displays a special-effect-shooting operation menu screen W1 (see (a) in FIG. 3). In the special-effect-shooting operation menu screen W1, the information related to the special effect operations implementable in the imaging apparatus 1 is displayed in the form of icons A1 to A5.

Subsequently, when the user operates the up button 214a or the down button 214b of the operation switch 214, the control unit 31 instructs the display unit 25 to change the contents in the special-effect-shooting operation menu screen W1 that is being displayed in response to the operation signal input from the operation switch 214. More particularly, in response to the operation signal input from the operation switch 214, the control unit 31 changes the colors of the icons A1 to A5 displayed in the special-effect-shooting operation menu screen W1 as well as instructs the display unit 25 to display the titles of special effect operations such as "fantastic focus", "toy photo", and "gentle sepia" corresponding to the selected icons ((a) in FIG. 3→(b) in FIG. 3→(c) in FIG. 3). That enables the user to select the intended special effect operation and instinctively confirm the selected special effect operation.

Then, as the user presses the decision button 214e of the operation switch 214, the control unit 31 sets the special effect operation such as "fantastic focus" (see (a) in FIG. 3), which is being displayed at that point of time in the special-effect-shooting operation menu screen W1 by the display unit 25, as the special effect operation to be performed in the special effect shooting mode. Herein, the information regarding the special effect operation that has been set is stored in the memory 13.

Subsequently, the control unit 31 instructs the display unit 25 to display a live view image corresponding to the image data on which the image processing unit 14 has performed the special effect operation as selected on the special-effect-shooting operation menu screen W1. Because of that, the user becomes able to see in real-time the live view image, which is generated as a result of performing the selected special effect operation on the image data of the captured image, and accordingly determine the photographic composition.

Figure 4:
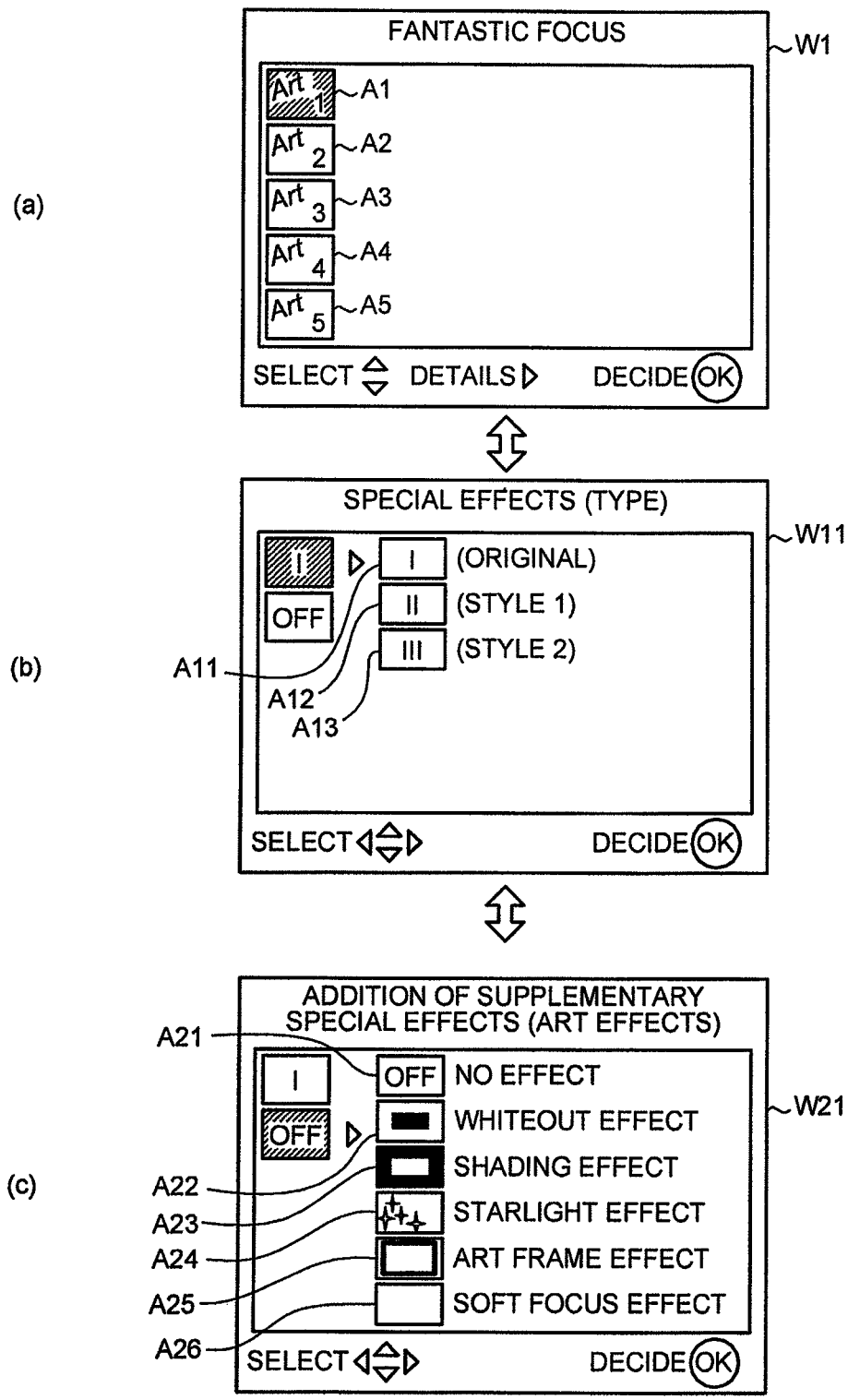
FIG. 4 is a diagram illustrating another example of transition of special-effect-shooting operation menu screens displayed by the display unit during the special effect shooting mode when the imaging apparatus according to the first embodiment is set to the special effect shooting mode.

FIG. 4 is a diagram illustrating another example of transition of special-effect-shooting operation menu screens displayed by the display unit 25 during the special effect shooting mode when the imaging apparatus 1 is set to the special effect shooting mode.

As illustrated in FIG. 4, while the special-effect-shooting operation menu screen W1 is being displayed by the display unit 25; if the user operates the right button 214d of the operation switch 214, the control unit 31 instructs the display unit 25 to display a settings modification screen W11 that makes it possible to change the settings regarding the selected special effect operation ((a) in FIG. 4→(b) in FIG. 4). The settings modification screen W11 is a screen for changing the settings of each special effect operation set in the imaging apparatus 1 and has icons A11 to A13 corresponding to different settings regarding the selected special effect operation displayed thereon.

The icon A11 corresponds to the original settings of the selected special effect operation; while each of the icons A12 and A13 corresponds to the changed settings in which a parameter such as the tone or the contrast is changed as compared to the original settings.

Subsequently, while the display unit 25 is displaying the settings modification screen W11, the user operates the right button 214d of the operation switch 214 and changes the settings of the selected special effect operation. More particularly, the user operates the right button 214d to make the icons A11 to A13 selectable; operates the up button 214a or the down button 214b so as to select the intended icon; and then operates the decision button 214e to finalize the settings of the special effect operation.

In the condition illustrated in (b) in FIG. 4, if the user operates the down button 214b, then the control unit 31 instructs the display unit 25 to display a supplementary-special-effect addition screen W21 ((c) in FIG. 4). The supplementary-special-effect addition screen W21 is used to add the settings of special effect supplementary operations (art effects) to each special effect operation set in the imaging apparatus 1. Thus, regarding the selected special effect operation, icons A21 to A26 are displayed that correspond to the supplementary special effect operations which can be additionally set with respect to the selected special effect operation.

The icon A21 is an icon for not adding a supplementary special effect operation in the selected special effect operation. The icon A22 is an icon for adding the whiteout effect as the supplementary special effect operation in the selected special effect operation. The icon A23 is an icon for adding the shading effect as the supplementary special effect operation in the selected special effect operation. The icon A24 is an icon for adding the starlight effect as the supplementary special effect operation in the selected special effect operation. The icon A25 is an icon for adding the art frame effect as the supplementary special effect operation in the selected special effect operation. The icon A26 is an icon for adding the soft focus effect as the supplementary special effect operation in the selected special effect operation.

Subsequently, while the display unit 25 is displaying the supplementary-special-effect addition screen W21, the user operates the operation switch 214 and sets the supplementary special effect operation to be added in the selected special effect shooting mode. More particularly, the user operates the right button 214d to make the icons A21 to A26 selectable; operates the up button 214a or the down button 214b so as to select the intended icon; and then operates the decision button 214e to finalize the supplementary special effect operation to be added in the special effect shooting mode.

Figure 5:
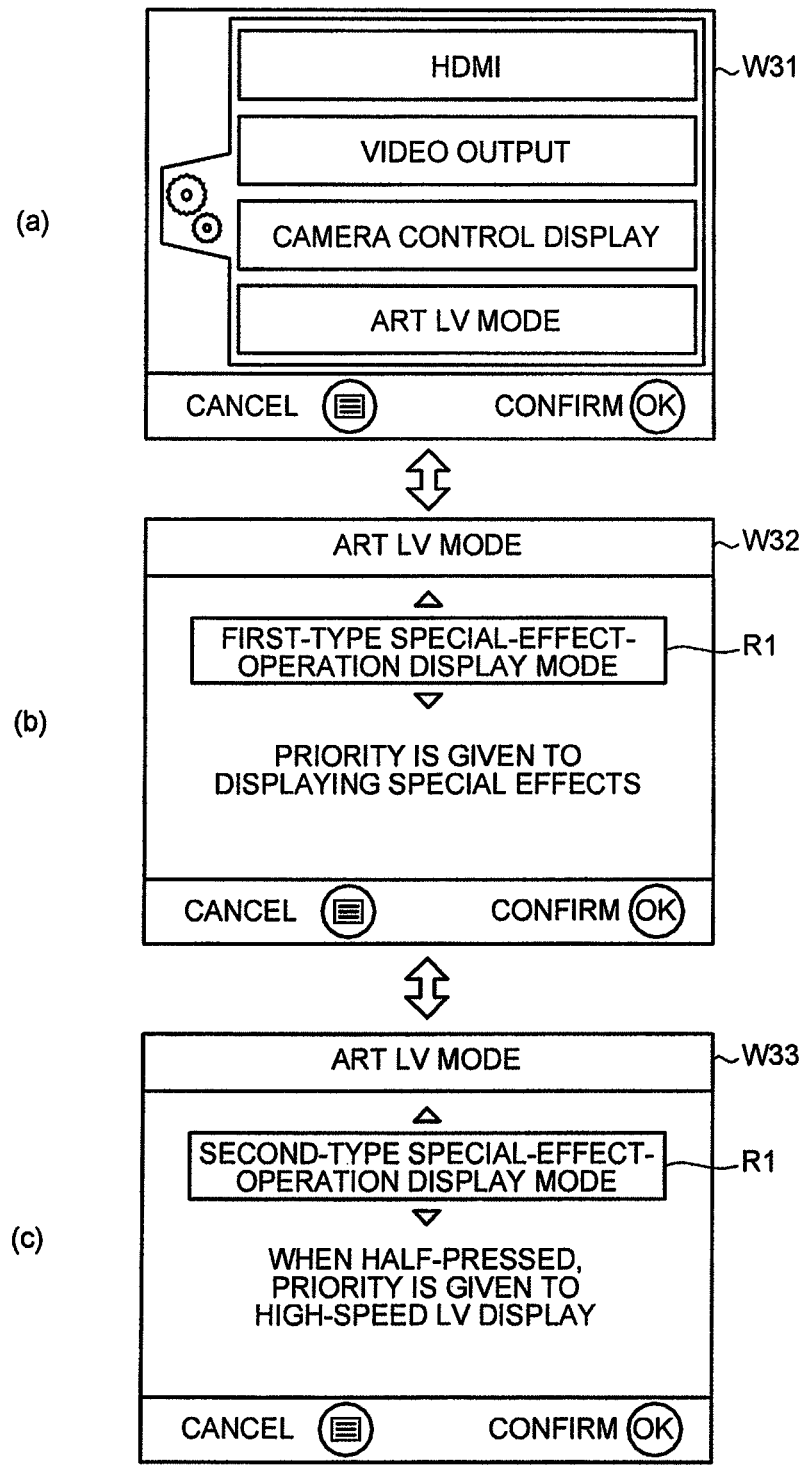
FIG. 5 is a diagram illustrating an example of transition of screens displayed by the display unit in response to a user operation of a menu switch according to the first embodiment.

FIG. 5 is a diagram illustrating an example of transition of screens displayed by the display unit 25 in response to an operation of the menu switch 215 by the user. When the user operates the menu switch 215, the control unit 31 instructs the display unit 25 to display a customization menu screen W31 ((a) in FIG. 5).

Subsequently, if the user operates the down button 214b of the operation switch 214 to select an art LV mode and then operates the decision button 214e, then the control unit 31 instructs the display unit 25 to display an art-LV-mode setting menu screen W32 so as to enable the user to set the display format of the live view image displayed by the display unit 25 ((b) in FIG. 5).

Then, the user operates the up button 214a or the down button 214b and selects the intended display mode from among a plurality of display modes included in the art LV mode ((c) in FIG. 5. Once the title of the intended display mode is displayed in a selected-mode display area R1, the user operates the decision button 214e. At that time, in the imaging apparatus 1, the control unit 31 sets the display mode such as a second-type special-effect-operation display mode that is being displayed in the mode display area R1. Moreover, the control unit 31 instructs the display unit 25 to display a supplementary message regarding the display mode. That enables the user to instinctively understand the contents of the displayed mode that would be selected.

Herein, in a first-type special-effect-operation display mode; the display unit 25 displays, as a live view image, the image data that has been subjected to the first-type special effect operation by the image processing unit 14 in the special effect shooting mode. Similarly, in the second-type special-effect-operation display mode; the display unit 25 displays, as a live view image, the image data that has been subjected to the second-type special effect operation by the image processing unit 14 in the special effect shooting mode.

Explained below with reference to FIGS. 6 and 7 are the operation contents of the special effect operation performed by the image processing unit 14 in the special effect shooting mode. FIG. 6 is a diagram of an example of a special-effect-operation information table stored in the special-effect-operation information storing unit 262. FIG. 7 is a diagram of an example of a supplementary-special-effect-operation information table stored in the supplementary-special-effect-operation information storing unit 263.

As illustrated in FIG. 6, in a special-effect-operation information table T1 are specified the special effect operations, which can be performed on the image data by the image processing unit 14 in the special effect shooting mode, and are specified the image processing operations performed during the first-type special effect operation and during the second-type special effect operation in each special effect operation. For example, consider the case of "fantastic focus" of "Art1" as the special effect operation that is set in the special effect shooting mode. For that special effect operation, "tone curving", "airbrushing", and "image synthesis" are specified as the image processing operations performed during the first-type special effect operation; while "tone curving" and "airbrushing" are specified as the image processing operations performed during the second-type special effect operation. Herein, image synthesis points to the image processing operation in which image data is generated by synthesizing the image data that has been subjected to tone curving by the special effect processing unit 141 and the image data that has been subjected to airbrushing by the special effect processing unit 141.

Moreover, consider the case of "diorama" of "Art4" as the special effect operation that is set in the special effect shooting mode. For that special effect operation, "hue/color saturation processing", "contrast processing", "airbrushing (thrice)", and "image synthesis (thrice)" are specified as the image processing operations performed during the first-type special effect operation; while "hue/color saturation processing", "contrast processing", "airbrushing (once)", and "image synthesis (once)" are specified as the image processing operations performed during the second-type special effect operation. Herein, "airbrushing (thrice)" points to the operation in which the image processing unit 14 thrice performs airbrushing on the image data that has been subjected to hue/color saturation processing and contrast processing. Moreover, "image synthesis (thrice)" points to the image processing operation in which, every time the image processing unit 14 performs airbrushing, image data is generated by synthesizing the pre-airbrushing image data and the post-airbrushing image data.

In this way, from among a plurality of image processing operations performed during the first-type special effect operation, the second-type special effect operation cuts down on those image processing operations which have a prolonged processing time with respect to the image data and thus reduces the processing time of the special effect operation with respect to the image data (for example, see Art1 in FIG. 6). Besides, from among a plurality of image processing operations performed during the first-type special effect operation, the second-type special effect operation reduces the number of times for which the image processing operations having a prolonged processing time with respect to the image data are performed and thus reduces the processing time of the special effect operation with respect to the image data (for example, see Art4 in FIG. 6). That is, the time required for performing image processing operations during the second-type special effect operation is shorter than the time required for performing image processing operations during the first-type special effect operation.

Given below is the explanation regarding the supplementary-special-effect-operation information table stored in the supplementary-special-effect-operation information storing unit 263. As illustrated in FIG. 7, in a supplementary-special-effect-operation information table T2 are specified the supplementary special effect operations, which are addable to a special effect operation, and are specified the image processing operations performed during a first-type supplementary special effect operation and during a second-type supplementary special effect operation in each supplementary special effect operation. More particularly, if "whiteout effect" of "Effect1" is the supplementary special effect operation addable to the special effect operation, then "whiteout processing" is specified as the image processing operation performed during the first-type supplementary special effect operation and "whiteout image synthesis" is specified as the image processing operation performed during the second-type supplementary special effect operation. Moreover, if "starlight effect" of "Effect3" is the supplementary special effect operation addable to the special effect operation, then "bright spot detection" and "striation drawing" are specified as the image processing operations performed during the first-type supplementary special effect operation and "x" is specified as an indication that no supplementary special effect operation is performed during the second-type supplementary special effect operation.

In this way, by changing the image processing operations in the special effect operation performed by the image processing unit 14, the control unit 31 can make sure that the live view image is displayed at a faster display frame rate (120 fps) than the predetermined display frame rate (60 fps), with which the display unit 25 displays the image data that has been subjected to the special effect operation by the image processing unit 14.

Figure 8:
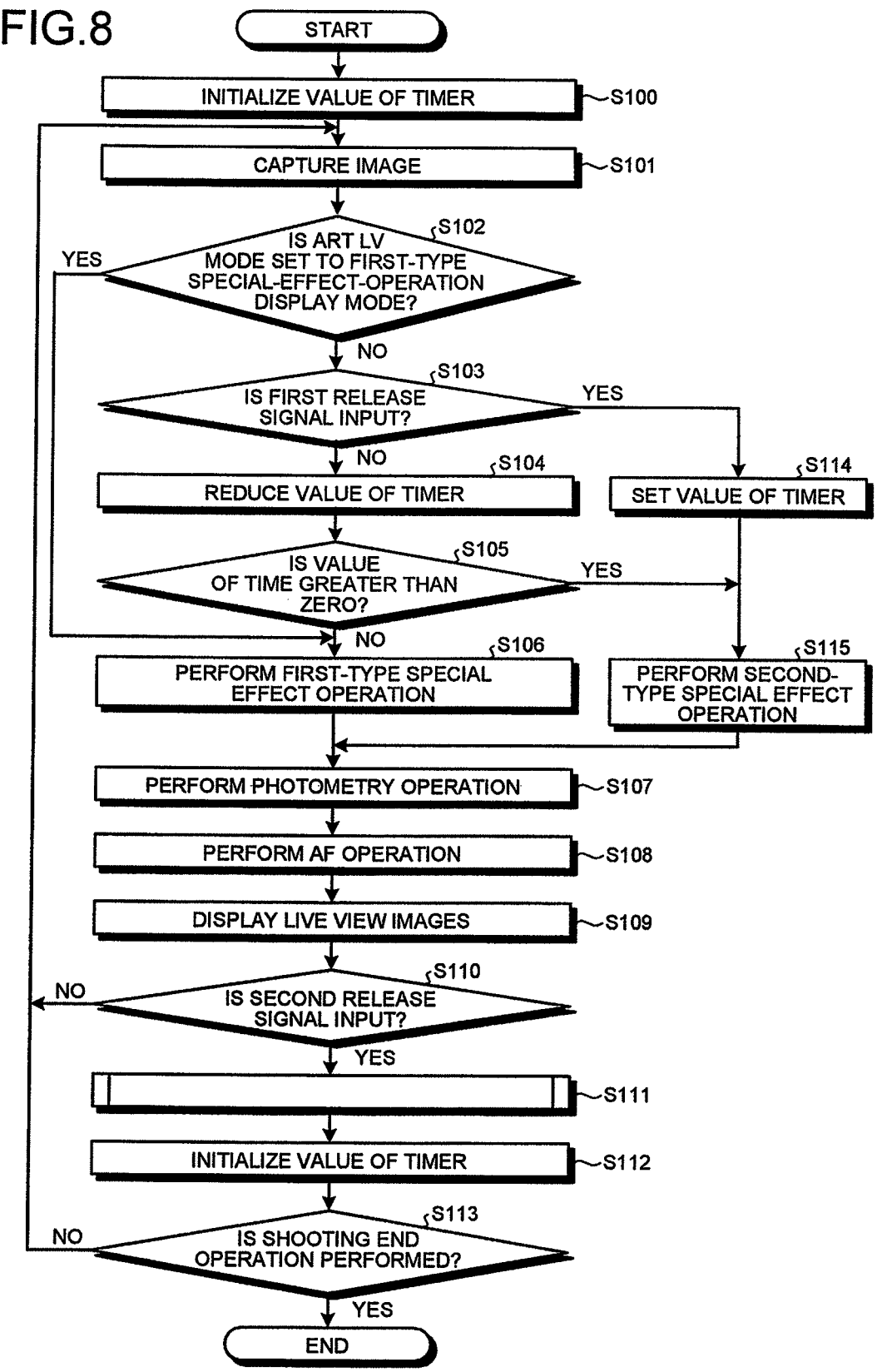
FIG. 8 is a flowchart for explaining in brief the operations performed in the special effect shooting mode by the imaging apparatus according to the first embodiment.
Figure 9:
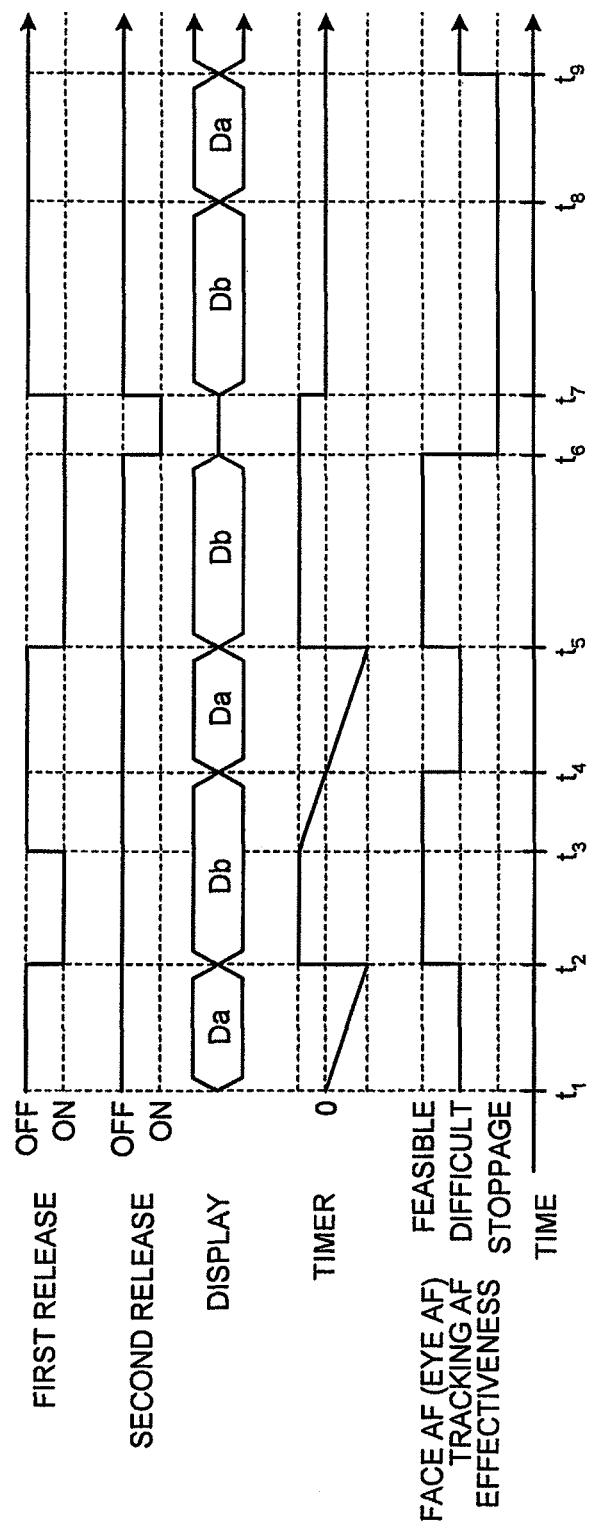
FIG. 9 is a time chart for illustrating in brief the operations performed in the special effect shooting mode by the imaging apparatus according to the first embodiment.

Given below is the explanation of the operations performed by the imaging apparatus 1 in which the special effect operation to be performed in the special effect shooting mode is set through the abovementioned stages. FIG. 8 is a flowchart for explaining in brief the operations performed by the imaging apparatus 1 in the special effect shooting mode. FIG. 9 is a time chart for illustrating in brief the operations performed by the imaging apparatus 1 in the special effect shooting mode.

Meanwhile, although the following explanation is given with reference to still image shooting, the explanation is also applicable to video shooting.

As illustrated in FIG. 8, firstly, the control unit 31 initializes the value of the timer 19 (Step S100) and the imaging apparatus 1 starts capturing images of a photographic subject (Step S101). More particularly, the imaging element 11 continuously generates image data at small time intervals and outputs the generated image data to the memory 13 via the A/D conversion unit 12.

Then, the control unit 31 determines whether or not the art LV mode of the imaging apparatus 1 is set to the first-type special-effect-operation display mode (Step S102). If the art LV mode of the imaging apparatus 1 is set to the first-type special-effect-operation display mode (Yes at Step S102), then the system control proceeds to Step S106 described later. In contrast, if the art LV mode of the imaging apparatus 1 is not set to the first-type special-effect-operation display mode (No at Step S102), then the system control proceeds to Step S103 described below.

The control unit 31 determines whether or not the release switch 212 has been half-pressed and whether or not a first release signal that provides an instruction regarding the shooting preparation operation has been input from the release switch 212 (Step S103). If the first release signal has not been input from the release switch 212 (No at Step S103), then the control unit 31 reduces the value set in the timer 19 (Step S104, timing $t_1$) and determines whether or not the value set in the timer 19 is greater than zero (Step S105). If the value set in the timer 19 is greater than zero (Yes at Step S105), then the system control proceeds to Step S115 described later. In contrast, if the value set in the timer 19 is not greater than zero (No at Step S105, timing $t_1$ to timing $t_2$), then the system control proceeds to Step S106 described below.

Then, the control unit 31 instructs the image processing unit 14 to perform the first-type special effect operation (Step S106). For that, the image processing unit 14 obtains image data from the memory 13 and performs the first-type special effect operation on the obtained image data. More particularly, the image processing unit 14 refers to the special-effect-operation information table T1 stored in the special-effect-operation information storing unit 262 and performs the first-type special effect operation corresponding to the special effect operation that has been set. For example, if "fantastic focus" is the special effect operation that has been set, then the image processing unit 14 performs tone curving, airbrushing, and image synthesis on the obtained image data and outputs the processed image data to the memory 13 (see FIG. 6). Moreover, if a supplementary special effect operation such as "whiteout effect" is additionally set in the special effect operation (see FIG. 7), then the image processing unit 14 refers to the supplementary-special-effect-operation information table T2 stored in the supplementary-special-effect-operation information storing unit 263 and performs the first-type supplementary special effect operation corresponding to the additionally-set supplementary special effect operation on the image data that has been subjected to the first-type special effect operation.

Subsequently, based on the image data stored in the memory 13, the control unit 31 instructs the exposure processing unit 17 to perform a photometry operation for measuring the amount of light that is incident via the lens unit 3 (Step S107) and instructs the AF processing unit 18 to perform an AF operation (Step S108). More particularly, the AF processing unit 18 obtains the image data from the memory 13 via the control unit 31 and, based on the contrast in the obtained image data, drives the lens driving unit 42 of the lens unit 3 so as to move the lenses of the optical system 41 on the optical axis L for the purpose of adjusting the point of focus of the imaging apparatus 1.

Then, from the memory 13, the control unit 31 sequentially reads the image data that has been subjected to the special effect operation by the image processing unit 14, and instructs the display unit 25 to chronologically display the live view images corresponding to the image data that has been read (Step S109). At that time, since the first-type special effect operation performed by the image processing unit 14 takes a prolonged processing time, the display unit 25 performs display at a display frame rate (Da) of, for example, 60 fps. Thus, although feasible in nature, it becomes extremely difficult for the imaging apparatus 1 to perform face AF (eye AF) and tracking AF (for example, timing $t_1$ to timing $t_2$ or timing $t_4$ to timing $t_5$ illustrated in FIG. 9).

Subsequently, if a second release signal is not yet input (No at Step S110), then the system control returns to Step S101. On the other hand, if a second release signal has been input (Yes at Step S110), then the imaging apparatus 1 performs a still image shooting operation in which the image data output by the imaging element 11 is stored in the external memory 27 (Step S111).

Then, the control unit 31 initializes the value set in the timer 19 (Step S112) and determines whether or not an end operation for ending the special effect shooting mode has been performed (Step S113). For example, the control unit 31 determines whether or not the shooting mode changeover switch 213 has been operated and a changeover signal instructing a change to another shooting mode such as a replay mode has been input from the shooting mode changeover switch 213. If the end operation for ending the special effect shooting mode has not been performed (No at Step S113), then the system control returns to Step S101. On the other hand, if the end operation for ending the special effect shooting mode has been performed (Yes at Step S113), then the imaging apparatus 1 stops performing the operations.

Given below is the explanation of the case when the first release signal is input (Yes at Step S103, timing $t_2$). In that case, the control unit 31 sets the value of the timer 19 (Step S114). More particularly, in the timer 19, the control unit 31 sets 100 as the value indicating the time for terminating the shooting preparation operation.

Then, the control unit 31 instructs the image processing unit 14 to perform the second-type special effect operation (Step S115). For that, the image processing unit 14 obtains the image data from the image data and performs the second-type special effect operation on the obtained image data. More particularly, the image processing unit 14 refers to the special-effect-operation information table T1 stored in the special-effect-operation information storing unit 262 and performs the second-type special effect operation corresponding to the special effect operation that has been set. For example, if "fantastic focus" is the special effect operation that has been set, then the image processing unit 14 performs tone curving and airbrushing on the obtained image data and outputs the processed image data to the memory 13 (see FIG. 6). Moreover, if a supplementary special effect operation such as "whiteout effect" is additionally set in the special effect operation (see FIG. 7), then the image processing unit 14 refers to the supplementary-special-effect-operation information table T2 stored in the supplementary-special-effect-operation information storing unit 263 and performs the second-type supplementary special effect operation corresponding to the additionally-set supplementary special effect operation on the image data that has been subjected to the second-type special effect operation.

Then, the imaging apparatus 1 repeats the operations from Step S101 to Step S109 until a second release signal is input. At that time, there is a decrease in the processing time of the second-type special effect operation performed by the image processing unit 14, and the display unit 25 performs display at a display frame rate of, for example, 120 fps that is faster than the predetermined display frame rate (Da). Hence, the imaging apparatus can perform face AF (eye AF) and tracking AF without difficulty (for example, timing $t_2$ to timing $t_4$ or timing $t_5$ to timing $t_6$ (see FIG. 9)). That enables the user to select the photographic composition while viewing the live view images, which correspond to the image data that has been subjected to the special effect operation by the image processing unit 14 and which are displayed at the display frame rate (120 fps) by the display unit 25 in the normal shooting mode. Moreover, the user can also perform shooting while using AF operations such as face AF, eye AF, and tracking AF that supplement the shooting task. That reduces the possibility of the user missing the photo opportunity of the photographic subject.

Figure 10:
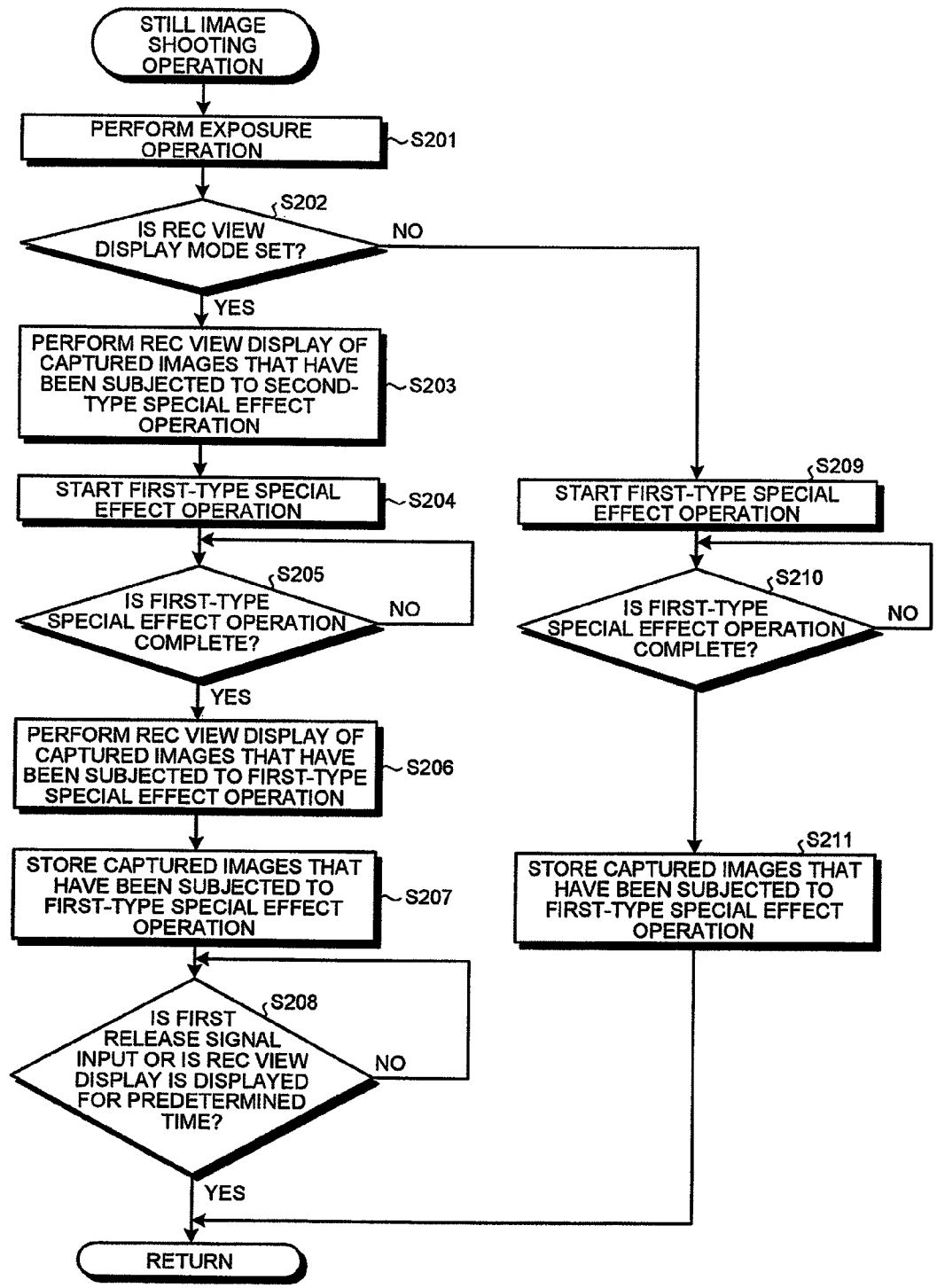
FIG. 10 is a flowchart for explaining in brief a still image shooting operation illustrated in FIG. 8.

Given below is the explanation regarding the still image shooting operation illustrated in FIGS. 8 and 9. FIG. 10 is a flowchart for explaining in brief the still image shooting operation (Step S111) illustrated in FIG. 8.

As illustrated in FIG. 10, firstly, the control unit 31 instructs the exposure processing unit 17 to perform an exposure operation (Step S201). More particularly, based on the image data stored in the memory 13 via the control unit 31, the exposure processing unit 17 drives the lens driving unit 42 and the aperture driving unit 44, and adjusts the exposure of the imaging apparatus 1 for still image shooting.

Then, the control unit 31 determines whether or not an REC view display mode is set that enables confirmation of the captured image data (Step S202). If the REC view display mode is not set (No at Step S202), then the system control proceeds to Step S209 described later.

On the other hand, if the REC view display mode is set (Yes at S202), then the control unit 31 instructs the display unit 25 to display the REC view display of the captured images corresponding to the image data that has been subjected to the second-type special effect operation by the image processing unit 14 (Step S203, timing $t_7$ to timing $t_8$ (see FIG. 9)) and instructs the image processing unit 14 to start the special effect operation (Step S204). More particularly, the image processing unit 14 obtains, from the memory 13, the image data that is generated by the imaging element 11 after the adjustment in the exposure of the imaging apparatus 1, and performs the first-type special effect operation on the obtained image data.

Then, the control unit 31 determines whether or not the image processing unit 14 has completed the first-type special effect operation on the image (Step S205). If the image processing unit 14 is yet to complete the first-type special effect operation (No at Step S205), the control unit 31 repeats that determination. When the image processing unit 14 completes the first-type special effect operation (Yes at Step S205), the control unit 31 instructs the display unit 25 to display the REC view display of the captured images corresponding to the image data that has been subjected to the first-type special effect operation by the image processing unit 14 (Step S206, timing $t_8$ to timing $t_9$ (see FIG. 9)).

Subsequently, the control unit 31 stores, in the external memory 27, the captured image data that has been subjected to the first-type special effect operation by the image processing unit 14 (Step S207). Before storing the captured image data in the external memory 27, the control unit 31 instructs the image processing unit 14 to perform compression processing such as JPEG processing or RAW processing on the captured image data.

If a first release signal is not yet input or if the REC view display is not yet displayed for a predetermined time such as five seconds (No at Step S208), then the control unit 31 repeats that determination. On the other hand, when a first release signal is input or when the REC view display is displayed for a predetermined time (Yes at Step S208), the system control returns to the main routine illustrated in FIG. 8.

Explained below is the case when the REC view display mode is not set (No at Step S202). In that case, the control unit 31 instructs the image processing unit 14 to start the first-type special effect operation (Step S209), and then determines whether or not the image processing unit 14 has completed the first-type special effect operation on the image data (Step S210). If the image processing unit 14 is yet to complete the first-type special effect operation (No at Step S210), the control unit 31 repeats that determination. When the image processing unit 14 completes the first-type special effect operation (Yes at Step S210); the control unit 31 stores, in the external memory 27, the captured image data that has been subjected to the first-type special effect operation by the image processing unit 14 (Step S211). Then, the system control returns to the main routine illustrated in FIG. 8.

According to the first embodiment described above, when a first release signal is input from the release switch 212, the control unit 31 switches the special effect operation to be performed by the image processing unit 14 from the first-type special effect operation to the second-type special effect operation. That enables the control unit 31 to instruct the display unit 25 to display the image data, which has been subjected to the special effect operation, as live view images at a faster display frame rate than the predetermined display frame rate. As a result, even while shooting in the special effect shooting mode, the imaging apparatus 1 enables achieving reduction in the possibility of missing the photo opportunity of the photographic subject.

Moreover, according to the first embodiment, since the image data that has been subjected to the special effect operation by the image processing unit 14 can be displayed as live view images at a faster display frame rate than the predetermined display frame rate, face AF or tracking AF can be stably performed without any break up. Moreover, face AF frames or tracking AF frames can be continuously displayed by the display unit 25 without any break up.

Furthermore, according to the first embodiment, since live view images that are smooth in nature are displayed by the display unit 25, photographic composition can be determined without difficulty while following a moving photographic subject.

Moreover, according to the first embodiment, at the time of making the display unit 25 to perform the REC view display, the display unit 25 is configured to firstly display the captured images that have been subjected to the second-type special effect operation by the image processing unit 14 and then to replace those images with the captured images obtained as a result of the first-type special effect operation having a prolonged processing time. As a result, the user is spared from having to wait to confirm the captured images that have been subjected to the special effect operation by the image processing unit 14.

Second Embodiment

Given below is the explanation of a second embodiment of the present invention. In the first embodiment described above, the explanation is given for the case when the imaging apparatus 1 is set to the special effect shooting mode. In contrast, in the second embodiment of the present invention, the explanation is given for the case in which the imaging apparatus 1 performs the special effect operation in P/A/S/M modes in which the user is allowed to perform manual advanced settings. Meanwhile, the imaging apparatus according to the second embodiment of the present invention has an identical configuration to the configuration of the abovementioned imaging apparatus 1. Hence, the explanation of that configuration is not repeated.

Firstly, when the user operates the power ON/OFF switch 211 to switch ON the imaging apparatus 1, the control unit 31 determines whether the imaging apparatus 1 is set to any one of the P/A/S/M modes. More particularly, the control unit 31 determines whether the shooting mode changeover switch 213 is set to any one of the P/A/S/M modes (see FIG. 1). When the shooting mode of the imaging apparatus 1 is set to any one of the P/A/S/M modes, the control unit 31 instructs the display unit 25 to display live view images corresponding to the P/A/S/M modes.

Herein, the P/A/S/M modes respectively point to a program shooting mode, an aperture priority shooting mode, a shutter priority shooting mode, and a manual shooting mode. More particularly, in the program shooting mode, the imaging apparatus 1 automatically sets the aperture value and the shutter speed. In the aperture priority shooting mode, the user sets the aperture value and the imaging apparatus 1 automatically sets the shutter speed. In the shutter priority shooting mode, the user sets the shutter speed and the imaging apparatus 1 automatically sets the aperture value. In the manual shooting mode, the user sets the aperture value as well as the shutter speed.

Subsequently, while the display unit 25 is displaying a live view image; if the user operates the menu switch 215, the control unit 31 instructs the display unit 25 to display a customization menu screen.

Figure 11:
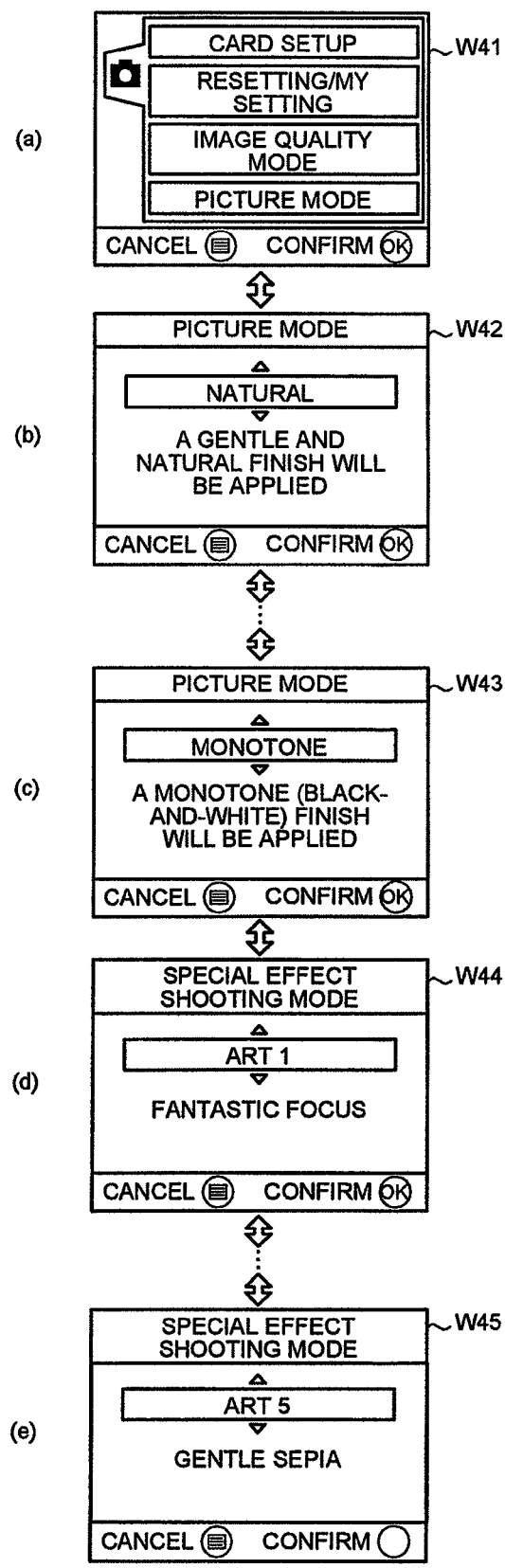
FIG. 11 is a diagram illustrating an example of a customization menu screen displayed by the display unit when the imaging apparatus according to a second embodiment of the present invention is set to any one of P/A/S/M modes.

FIG. 11 is a diagram illustrating an example of the customization menu screen displayed by the display unit 25 when the imaging apparatus 1 is set to any one of the P/A/S/M modes. As illustrated in FIG. 11, when the imaging apparatus 1 is set to any one of the P/A/S/M modes, the control unit 31 instructs the display unit 25 to display a customization menu screen W41 ((a) in FIG. 11). The customization menu screen W41 is used for changing various settings set in the imaging apparatus 1. For example, the customization menu screen W41 is used for changing the settings contents of the image quality mode or the picture mode.

Then, if the user operates the down button 214b of the operation switch 214 to select a picture mode and then presses the decision button 214e, the control unit 31 instructs the display unit 25 to display a picture mode setting screen W42 that is used for setting the contents of picture mode ((a) in FIG. 11→(b) in FIG. 11). The picture mode setting screen W42 is used for selecting, from a plurality of picture modes each having the image processing set corresponding to a shooting scene, parameters such as color tone, color saturation, hue, contrast, and brightness with the aim of obtaining the optimum result depending on the shooting purpose or depending on the photographic subject. Moreover, on the picture mode setting screen W42, a supplementary message of the selected picture mode is also displayed.

Subsequently, while the display unit 25 is displaying the picture mode setting screen W42; if the user operates the down button 214b of the operation switch 214, then the control unit 31 instructs the display unit 25 to display a subsequent picture mode setting screen W43 ((b) in FIG. 11→(c) in FIG. 11). Herein, in between the picture mode setting screen W42 and the picture mode setting screen W43, there exist a plurality of picture mode setting screens, and switching among such picture mode setting screens is done in response to the operation of the down button 214b of the operation switch 214 by the user.

Once the display unit 25 displays the picture mode setting screen W43; if the user operates the down button 214b of the operation switch 214, then the control unit 31 instructs the display unit 25 to display a special-effect-shooting-mode setting screen W44 ((c) in FIG. 11→(d) in FIG. 11). The special-effect-shooting-mode setting screen W44 is used to select the special effect operation or the special supplementary image operation to be performed on the captured image data. While the display unit 25 is displaying the special-effect-shooting-mode setting screen W44; if the user operates the down button 214b of the operation switch 214, then the control unit 31 instructs the display unit 25 to display a subsequent special-effect-shooting-mode setting screen W45 ((d) in FIG. 11→ (e) in FIG. 11). Herein, in between the special-effect-shooting-mode setting screen W44 and the special-effect-shooting-mode setting screen W45, there exist a plurality of special-effect-shooting-mode setting screens, and switching among such special-effect-shooting-mode setting screens is done in response to the operation of the down button 214b of the operation switch 214 by the user.

Given below with reference to FIGS. 12 and 13 is the explanation regarding the contents of the special effect operations performed by the image processing unit 14 when the special effect shooting mode is set to any one of the P/A/S/M modes of the imaging apparatus 1. FIG. 12 is a diagram illustrating an example of a special-effect-operation information table stored in the special-effect-operation information storing unit 262. FIG. 13 is a diagram illustrating an example of a supplementary-special-effect-operation information table stored in the supplementary-special-effect-operation information storing unit 263.

As illustrated in FIG. 12, in a special-effect-operation information table T3 are specified the special effect operations, which can be performed on the image data by the image processing unit 14 in the special effect shooting mode, and are specified the image processing operations performed during the first-type special effect operation and during the second-type special effect operation in each special effect operation. In the second embodiment, as the contents of second-type image processing operations performed by the image processing unit 14; the image processing operations of the picture mode that comes close to a special effect operation are specified in the second-type special effect operation. More particularly, if "fantastic focus" of "Art1" is set as the special effect operation in the special effect shooting mode, then "NATURAL" is specified as the image processing operation in the second-type special effect operation. Moreover, as illustrated in FIG. 13, in a supplementary-special-effect-operation information table T4, "x" is specified as an indication that no supplementary special effect operation is performed as the second-type image processing operations by the image processing unit 14.

Thus, as the second-type special effect operation performed by the image processing unit 14, instead of subjecting the image data to a special effect operation that includes a combination of a plurality of image processing operations, image processing is performed that corresponds to a picture mode in which at least one or more parameters such as the color tone and the contrast are changed. That leads to a decrease in the processing time of the image processing. As a result, the display unit 25 becomes able to display the live view images of the image data obtained by the image processing unit at a faster display frame rate than the predetermined display frame rate. Moreover, without causing any sense of discomfort to the user, the display unit 25 can display the live view images obtained by performing such image processing operations on the captured image data which come close to the special effects.

Figure 14:
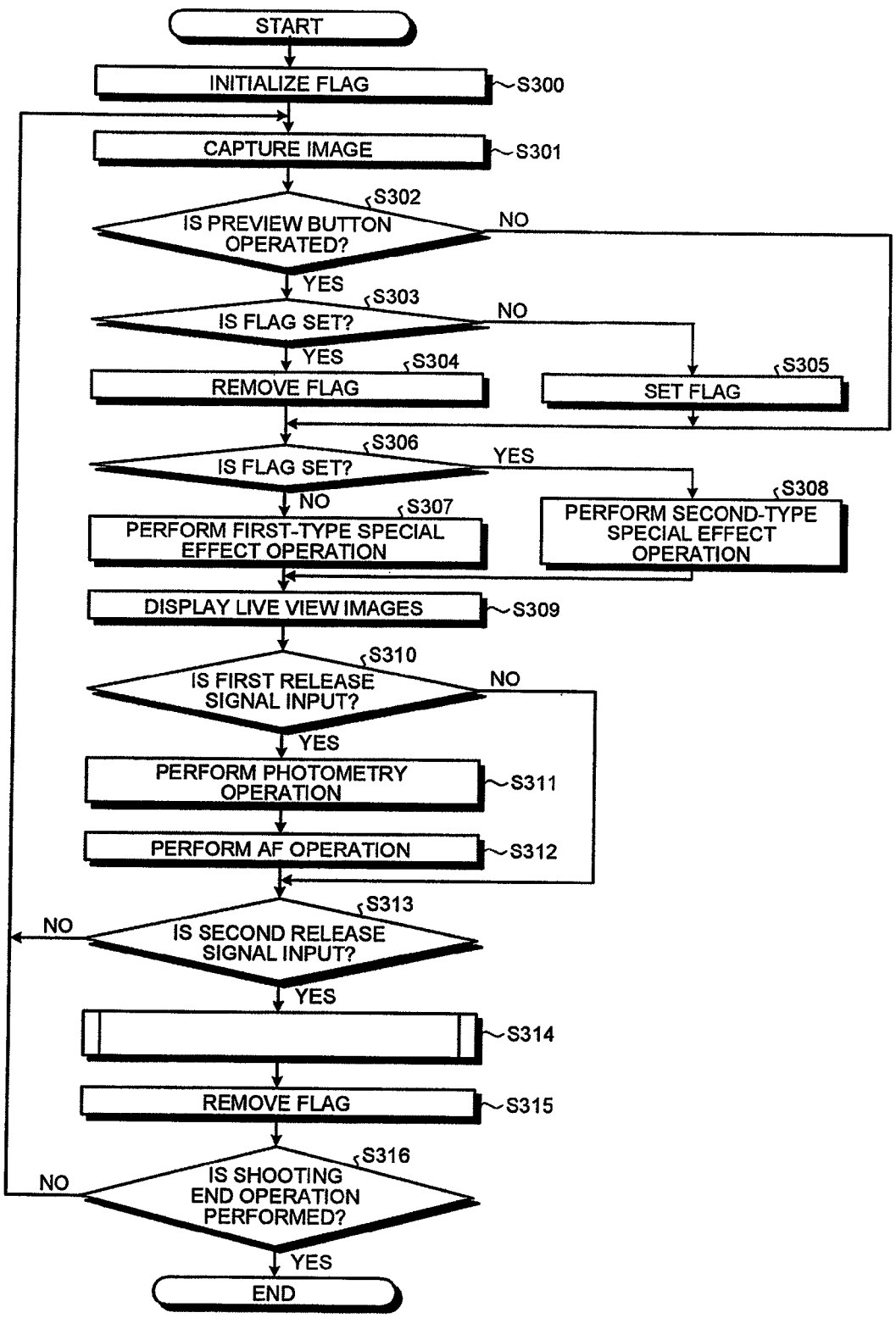
FIG. 14 is a flowchart for explaining the operations performed by the imaging apparatus according to the second embodiment in which the special effect shooting mode is set to any one of the P/A/S/M modes.

Given below is the explanation of the operations performed by the imaging apparatus 1 in which the special effect shooting mode is set to any one of the P/A/S/M modes through the abovementioned stages. FIG. 14 is a flowchart for explaining the operations performed by the imaging apparatus 1 in which the special effect shooting mode is set to any one of the P/A/S/M modes. Meanwhile, although the following explanation is given with reference to still image shooting, the explanation is also applicable to video shooting.

As illustrated in FIG. 14, firstly, the control unit 31 initializes a flag that is set in the memory 13 and that indicates an operation of the preview switch 216 (Step S300), and the imaging apparatus 1 starts capturing images of a photographic subject (Step S301). More particularly, the imaging element 11 continuously generates image data at small time intervals and outputs the generated image data to the memory 13 via the A/D conversion unit 12.

Then, the control unit 31 determines whether or not the preview switch 216 has been operated and a change instruction signal has been input from the preview switch 216 as an instruction for changing the contents of the special effect operation to be performed by the image processing unit 14 (Step S302). If the preview switch 216 has not been operated (No at Step S302), then the system control proceeds to Step S306 described later. On the other hand, if the preview switch 216 has been operated (Yes at Step S302), then the control unit 31 determines whether or not a flag indicating an operation of the preview switch 216 has been set in the memory 13 (Step S303). If the flag is set in the memory 13 (Step S303), then the control unit 31 removes the flag set in the memory 13 (Step S304) and the system control proceeds to Step S306 described later. On the other hand, if the flag has not been set in the memory 13 (No at Step S303), then the control unit 31 sets the flag in the memory 13 (Step S305) and the system control proceeds to Step S306 described below.

Subsequently, the control unit 31 determines whether or not the flag is set in the memory 13 (Step S306). If the flag is not set in the memory 13 (No at Step S306), then the control unit 31 instructs the image processing unit 14 to perform the first-type special effect operation (Step S307). More particularly, the image processing unit 14 obtains the image data from the memory 13, refers to the special-effect-operation information table T3 stored in the special-effect-operation information storing unit 262, performs the first-type special effect operation corresponding to the special effect operation that has been set, and outputs the processed image data to the memory 13. Moreover, if a supplementary special effect operation is additionally set with respect to the selected special effect operation; the image processing unit 14 refers to the supplementary-special-effect-operation information table T4 stored in the supplementary-special-effect-operation information storing unit 263 and performs the first-type supplementary special effect operation corresponding to the additionally-set supplementary special effect operation on the image data that has been subjected to the first-type special effect operation.

Given below is the explanation of the case when the flag is set in the memory 13 (Yes at Step S306). In that case, the control unit 31 instructs the image processing unit 14 to perform the second-type special effect operation of the special effect operation (Step S308). More particularly, the image processing unit 14 obtains the image data from the memory 13, refers to the special-effect-operation information table T3 stored in the special-effect-operation information storing unit 262, performs the second-type special effect operation corresponding to the special effect operation that has been set, and outputs the processed image data to the memory 13. For example, if "fantastic focus" is set as the special effect operation, then the image processing unit 14 implements the picture mode "NATURAL" as the second-type special effect on the image data (see FIG. 12). Moreover, if a supplementary special effect operation is additionally set with respect to the selected special effect operation; the image processing unit 14 refers to the supplementary-special-effect-operation information table T4 stored in the supplementary-special-effect-operation information storing unit 263 and performs the second-type supplementary special effect operation corresponding to the additionally-set supplementary special effect operation on the image data that has been subjected to the second-type special effect operation.

Then, from the memory 13, the control unit 31 sequentially reads the image data that has been subjected to the special effect operation by the image processing unit 14 and instructs the display unit 25 to chronologically display the live view images corresponding to the image data that has been read (Step S309).

Subsequently, the control unit 31 determines whether or not the release switch 212 has been half-pressed and whether or not a first release signal has been input from the release switch 212 (Step S310). If the first release signal has not been input from the release switch 212 (No at Step S310), then the system control proceeds to Step S313 described later. On the other hand, if the first release signal has been input from the release switch 212 (Yes at Step S310); then, based on the image data stored in the memory 13, the control unit 31 instructs the exposure processing unit 17 to perform a photometry operation for measuring the amount of light that is incident via the lens unit 3 (Step S311), and instructs the AF processing unit 18 to perform an AF operation (Step S312).

Then, if a second release signal is not yet input (No at Step S313), then the system control returns to Step S301. On the other hand, when a second release signals is input (Yes at Step S313); the imaging apparatus 1 performs, in an identical manner to that described in the first embodiment, a still image shooting operation (see FIG. 10) in which the image data output by the imaging element 11 is stored in the external memory 27 (Step S314).

Subsequently, the control unit 31 removes the flag set in the memory 13 (Step S315) and determines whether or not an end operation for ending the special effect shooting mode has been performed (Step S316). If the end operation for ending the special effect shooting mode has not been performed (No at Step S316), then the system control returns to Step S301. On the other hand, if the end operation for ending the special effect shooting mode has been performed (Yes at Step S316), then the imaging apparatus 1 stops performing the operations.

As described above in the second embodiment, depending on the operation details regarding the preview switch 216, the control unit 31 switches the special effect operation to be performed by the image processing unit 14 from the first-type special effect operation to the second-type special effect operation. As a result, in an identical manner to the first embodiment described earlier, it not only becomes possible to reduce the possibility of missing the photo opportunity of the photographic subject but also enables the AF processing unit 18 to perform face AF or tracking AF without difficulty. Moreover, face AF frames or tracking AF frames displayed by the display unit 25 can be continuously displayed without any break up. Besides, since live view images that are smooth in nature are displayed by the display unit 25, photographic composition can be determined without difficulty while following a moving photographic subject.

Furthermore, in the second embodiment, in the case of performing the second-type special effect operation on the image data, the image processing unit 14 replaces the image processing operations in the special effect operation with the image processing operations in the picture mode that comes close to the special effect operation that has been set. That enables achieving reduction in the processing time of the image processing performed on the image data. In addition, without causing any sense of discomfort to the user, it becomes possible to display the live view images that come close to the selected special effects.

Third Embodiment

Given below is the explanation of a third embodiment of the present invention. In the first embodiment described above, the special effect operation performed by the image processing unit 14 is switched using the release switch 212. In contrast, in the third embodiment of the present invention, the special effect operation performed by the image processing unit 14 is switched according to the operation contents of the lens operating unit 45 of the lens unit 3. Meanwhile, the imaging apparatus 1 according to the third embodiment of the present invention has an identical configuration to the configuration of the imaging apparatus 1 according to the first embodiment. Hence, the explanation of that configuration is not repeated.

Figure 15:
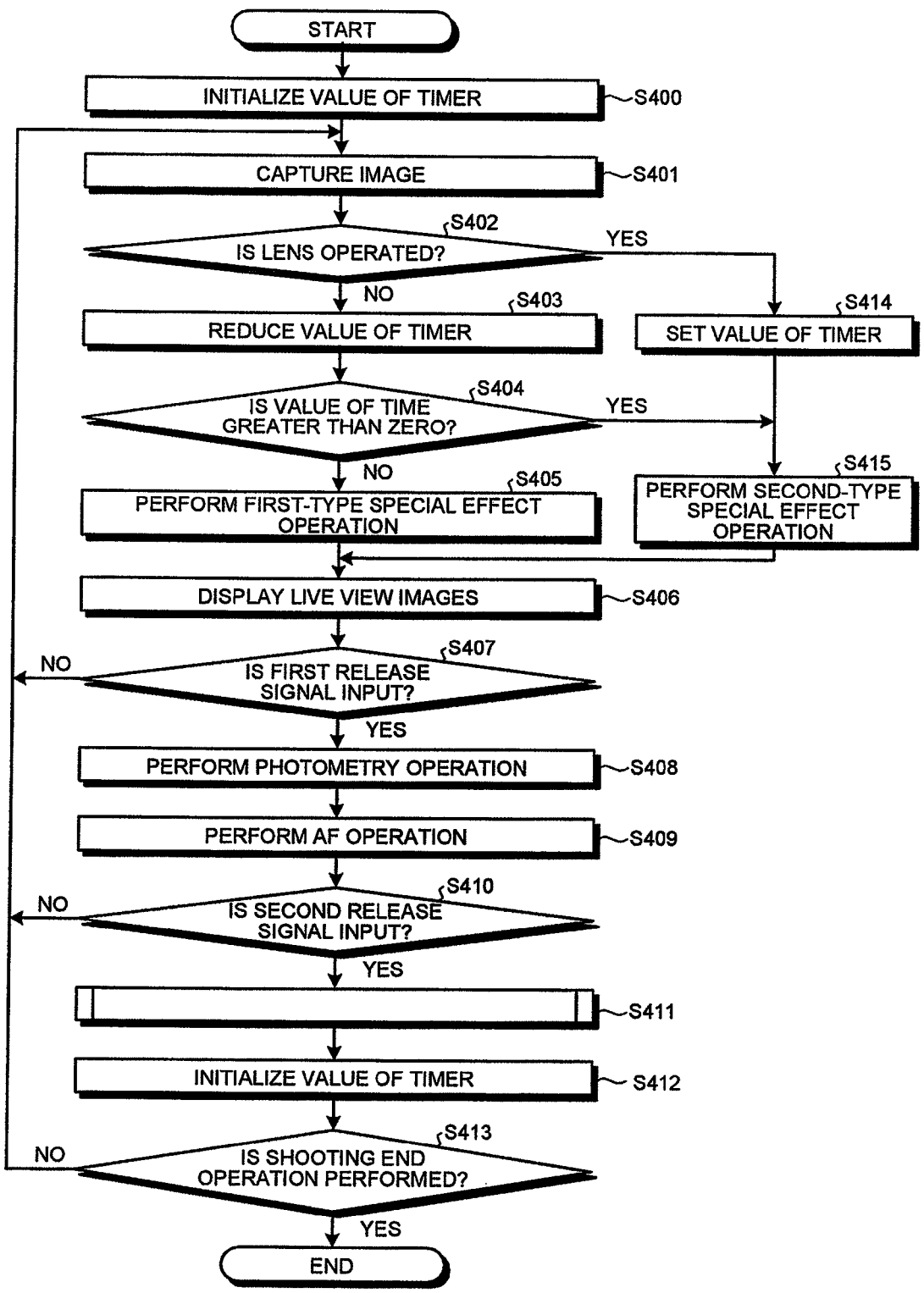
FIG. 15 is a flowchart for explaining in brief the operations performed in the special effect shooting mode by the imaging apparatus according to a third embodiment of the present invention.

FIG. 15 is a flowchart for explaining in brief the operations performed by the imaging apparatus 1 in the special effect shooting mode. Although the following explanation is given with reference to still image shooting, the explanation is also applicable to video shooting.

As illustrated in FIG. 15, firstly, the control unit 31 initializes the value of the timer 19 (Step S400) and the imaging apparatus 1 starts capturing images of a photographic subject (Step S401). More particularly, the imaging element 11 continuously generates image data at small time intervals and outputs the generated image data to the memory 13 via the A/D conversion unit 12.

Then, the control unit 31 determines whether or not the zoom operating unit 451 of the lens operating unit 45 has been operated (Step S402). If the zoom operating unit 451 of the lens operating unit 45 has not been operated (No at Step S402), then the control unit 31 reduces the value set in the timer 19 (Step S403). If the value set in the timer is not greater than zero (No at Step S404), then the system control proceeds to Step S405.

Subsequently, the control unit 31 instructs the image processing unit 14 to perform the first-type special effect operation corresponding to the special effect operation that has been set (Step S405). Herein, since the first-type special effect operation is identical to that described earlier in the first embodiment, the explanation thereof is not repeated.

Once the image processing unit 14 performs the first-type special effect operation; the control unit 31 sequentially reads, from the memory 13, the image data that has been subjected to the special effect operation by the image processing unit 14 and instructs the display unit 25 to chronologically display the live view images corresponding to the image data that has been read (Step S406).

Subsequently, if a first release signal is not yet input (No at Step S407), then the system control returns to Step S401. On the other hand, when a first release signal is input (Yes at Step S407), the control unit 31 instructs the exposure processing unit 17 to perform a photometry operation (Step S408) and instructs the AF processing unit 18 to perform an AF operation (Step S409).

Then, if a second release signal is not yet input (No at Step S410), the system control returns to Step S401. On the other hand, when a second release signal is input (Yes at Step S410); the imaging apparatus 1 performs, in an identical manner to that described in the first embodiment, a still image shooting operation in which the image data output by the imaging element 11 is stored in the external memory 27 (Step S411).

Once the still image shooting operation is performed, the control unit 31 initializes the value of the timer 19 (Step S412) and determines whether or not an end operation for ending the special effect shooting mode has been performed (Step S413). If the end operation for ending the special effect shooting mode has not been performed (No at Step S413), then the system control returns to Step S401. On the other hand, if the end operation for ending the special effect shooting mode has been performed (Yes at Step S413), then the imaging apparatus 1 stops performing the operations.

Given below is the explanation regarding the case when the zoom operating unit 451 of the lens operating unit 45 has been operated (Yes at Step S402). In that case, the control unit 31 sets a value in the timer 19 (Step S414).

Subsequently, the control unit 31 instructs the image processing unit 14 to perform the second-type special effect operation of the special effect operation that has been set (Step S415), and the system control proceeds to Step S406.

Meanwhile, if the value set in the timer 19 is greater than zero (Yes at Step S404), then the system control proceeds to Step S415.

According to the third embodiment described above, when the zoom operating unit 451 of the lens operating unit 45 is operated, the control unit 31 switches the special effect operation performed on the image data by the image processing unit 14 from the first-type special effect operation to the second-type special effect operation. Hence, the display unit 25 can display, at the predetermined display frame rate, the live view images corresponding to the image data on which the image processing unit 14 has performed the special effect operation. As a result, in the third embodiment, in an identical manner to the first embodiment, when shooting is performed in the special effect shooting mode; it not only becomes possible to reduce the possibility of missing the photo opportunity of the photographic subject but also enables the AF processing unit 18 to perform face AF or tracking AF without difficulty. Moreover, face AF frames or tracking AF frames displayed by the display unit 25 can be continuously displayed without any break up. Besides, since live view images that are smooth in nature are displayed by the display unit 25, photographic composition can be determined without difficulty while following a moving photographic subject.

Herein, according to the third embodiment, when the zoom operating unit 451 is operated, the control unit 31 switches the special effect operation to be performed by the image processing unit 14 from the first-type special effect operation to the second-type special effect operation. However, alternatively, the special effect operation performed by the image processing unit 14 can be switched from the first-type special effect operation to the second-type special effect operation by means of operating the focus operating unit 452. Moreover, instead of only the lens operating unit 45, the function of receiving input of a change instruction, which is issued for changing the contents of the special effect operation performed by the image processing unit 14, can also be provided in another switch such as the operation switch 214, the menu switch 215, the video switch 217, an Fn switch, an information switch, an exposure correction button, an AEL/AFL switch, a protect switch, a sub-dial switch, a zoom switch, or a focus movement switch installed in the imaging apparatus 1.

Fourth Embodiment

Given below is the explanation of a fourth embodiment of the present invention. In the imaging apparatus according to the fourth embodiment, only the control unit and the nonvolatile memory have a different configuration. Hence, the following explanation is given regarding only the nonvolatile memory and the control unit of the imaging apparatus according to the fourth embodiment. Meanwhile, in the following explanation, identical constituent elements are referred to by the same reference numerals.

Figure 16:
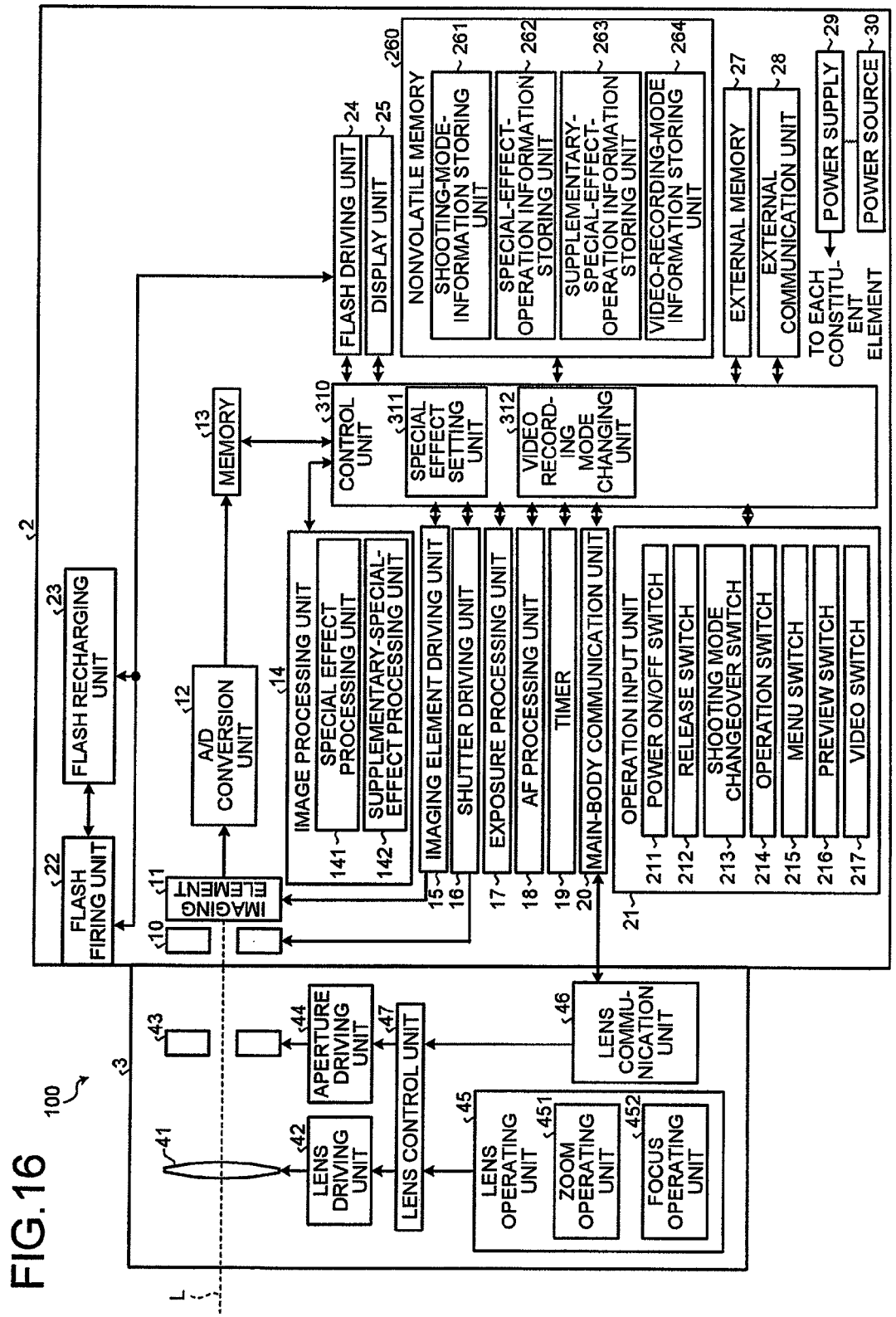
FIG. 16 is a block diagram illustrating a configuration of the imaging apparatus according to a fourth embodiment of the present invention.

FIG. 16 is a block diagram illustrating a configuration of the imaging apparatus according to the fourth embodiment. An imaging apparatus 100 illustrated in FIG. 16 is a digital single-lens reflex camera including the main body 2 and the lens unit 3 that is detachably attached to the main body 2.

Herein, a nonvolatile memory 260 is configured with a flash memory and is used in storing various programs for operating the imaging apparatus 100, in storing an imaging program according to the fourth embodiment, and in storing a variety of data or various parameters used during the execution of the programs. Moreover, the nonvolatile memory 260 includes the shooting-mode-information storing unit 261; the special-effect-operation information storing unit 262; the supplementary-special-effect-operation information storing unit 263; and a video-recording-mode information storing unit 264 for storing a video recording mode table in which combinations of the special effect operations performed by the image processing unit 14 and the video file formats are specified. Besides, the nonvolatile memory 260 can also be used to store the information related to the lens characteristics depending on the types of the lens unit 3 attachable to the main body 2.

Given below is the explanation of the video-recording-mode information table stored in the video-recording-mode information storing unit 264. FIG. 17 is a diagram illustrating the video-recording-mode information table stored in the video-recording-mode information storing unit 264.

As illustrated in FIG. 17, in a video-recording-mode information table T11, each special effect operation that can be performed on the image data by the image processing unit 14 is specified in a corresponding manner with a recording frame rate, a replaying frame rate, and applicable video file formats. For example, if "fantastic focus" of "Art1" is set as the special effect operation the image processing unit 14; then the recording frame rate is specified to be "24 fps", the replaying frame rate is specified to be "24 fps", and the applicable video file formats are specified to be "AVCHD" and "AVI".

By comparison, if "diorama" of "Art4" is set as the special effect operation in the image processing unit 14; the recording frame rate is specified to be "2 fps", the replaying frame rate is specified to be "15 fps", and the applicable video file format is specified to be "AVI". Herein, "AVI" points to a video file format that allows setting of the recording frame rate as well as the replaying frame rate; and "AVCHD" points to a video file format having a defined recording frame rate and a defined replaying frame rate.

In this way, in the video-recording-mode information table T11, each special effect operation performed by the image processing unit 14 is specified in a corresponding manner with a recording frame rate, a replaying frame rate, and applicable video file formats. Hence, even in the case when the user sets the video file format of the image data to AVCHD, it becomes possible to automatically change to the video file format of AVI depending on the special effect operation.

Given below is the explanation regarding the special effect operation illustrated in FIG. 17. In the special effect "fantastic focus", the mood is expressed with soft color tones and, while showing the details of the photographic subject, the image is finalized beautifully and fantastically as if enveloped in a happy light. The combination applied for the image processing in "fantastic focus" includes, for example, tone curving, airbrushing, and image synthesis.

In the special effect "toy photo", a shading effect is added around the screen and the hue is broken in yellow color so as to express the feeling of good old days or express the feeling of memories. Moreover, when "toy photo" is applied to video shooting, the slow frame advance effect can be put to use to express the feeling of good old days or express the feeling of memories that is peculiar to videos. The combination applied for the image processing in "toy photo" includes, for example, white balance processing, contrast processing, shading processing, and hue/color saturation processing.

In the special effect "rough monochrome", the roughness is expressed by adding extreme contrast and granular film noise. Moreover, when "rough monochrome" is applied to video shooting, the frame dropping effect can be put to use to express the roughness or the forcefulness that is peculiar to videos. The combination applied for the image processing in "rough monochrome" includes, for example, edge reinforcement, level correction/optimization, noise pattern generation, image synthesis, and contrast processing.

In the special effect "diorama", extreme defocusing is partially added to the screen and saturation is stressed so as to express a toy-like look or an artificial look. Moreover, when "diorama" is applied to video shooting, the fast forwarding effect can be put to use to express a toy-like look, an artificial look, or an imitation-like look. The combination applied for the image processing in "diorama" includes, for example, hue/color saturation processing, contrast processing, airbrushing, and image synthesis.

In the special effect "gentle sepia", a moist and elegant sepia touch is expressed with firm shadow portions in a calm atmosphere of an overall soft drawing. The combination applied for the image processing in "gentle sepia" includes, for example, level correction/optimization, tone curving, hue/color saturation processing, sepia conversion, and shadow hue rotation.

Herein, a control unit 310 is configured with a CPU, which reads programs from the nonvolatile memory 260 in accordance with the operation signals or the instruction signals received from the operation input unit 21 and executes those programs, and comprehensively controls the operations of the imaging apparatus 100 by means of forwarding instructions or data to each constituent element of the imaging apparatus 100. The control unit 310 includes a special effect setting unit 311 and a video recording mode changing unit 312.

According to a settings instruction signal issued by the operation input unit 21 for instructing the settings contents of the special effect operation performed by the image processing unit 14, the special effect setting unit 311 sets the special effect operation to be performed by the image processing unit 14. Herein, the special effect setting unit 311 stores, in the memory 13, the information related to the special effect operation to be performed by the image processing unit 14.

According to the special effect operation that is set by the special effect setting unit 311 and that is to be performed by the image processing unit 14, the video recording mode changing unit 312 changes the video recording mode of the image data that is to be stored in the external memory 27. The video recording mode changing unit 312 refers to the video-recording-mode information table T11 stored in the video-recording-mode information storing unit 264 and changes the video file format and/or the recording frame rate.

Figure 18:
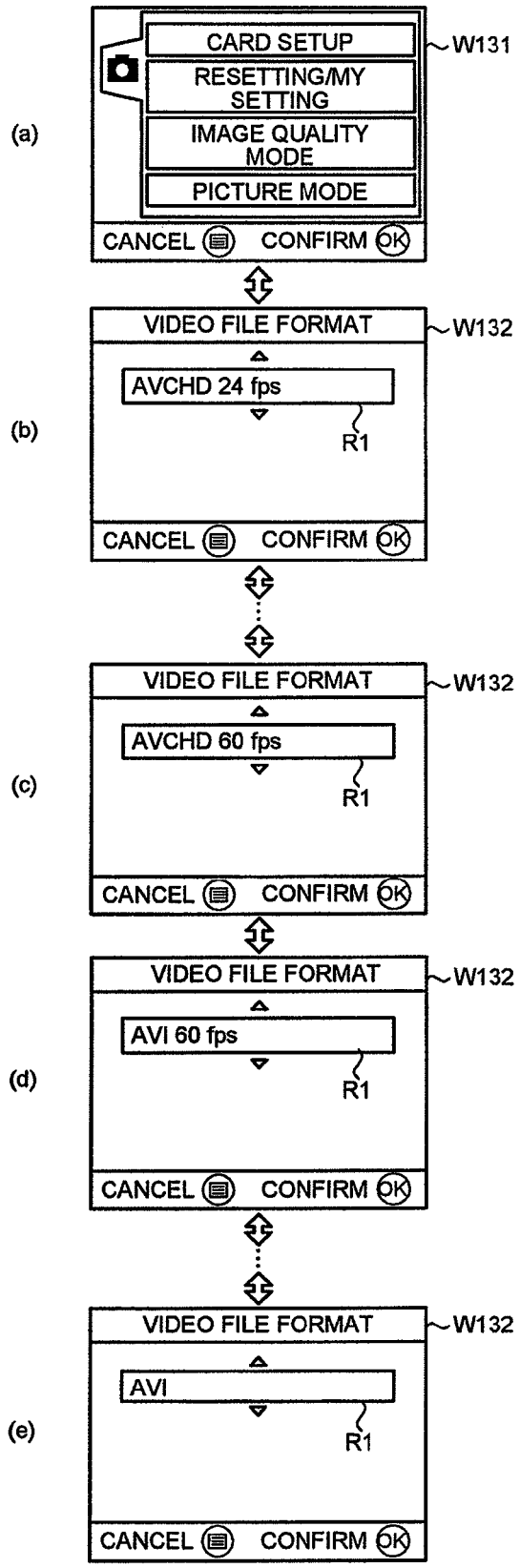
FIG. 18 is a diagram illustrating an example of transition of screens displayed by the display unit when the menu switch of the imaging apparatus according to the fourth embodiment is operated.

FIG. 18 is a diagram illustrating an example of transition of screens displayed by the display unit 25 when the menu switch 215 of the imaging apparatus 100 is operated.

While the display unit 25 of the imaging apparatus 100 is displaying live view images; if the user operates the menu switch 215, then the control unit 310 instructs the display unit 25 to display a customization menu screen ((a) in FIG. 18).

Subsequently, if the user operates the down button 214*b* of the operation switch 214 to select a video file and then operates the decision button 214*e*, then the control unit 310 instructs the display unit 25 to display a video-file-format setting menu screen W132 for a video file in which the video recording mode of the image data to be recorded is set ((b) in FIG. 18). The video-file-format setting menu screen W132 includes a file format display region R1 for displaying the video file format of the video file set in the imaging apparatus 100 at that point of time and for displaying the recording frame format defined in the video file format.

Subsequently, from among a plurality of file formats set in the imaging apparatus 100, the user selects the intended video file format by operating the up button 214*a* or the down button 214*b* ((b) in FIG. 18 to (e) in FIG. 18) and, when the contents of the intended video file format are displayed in the video format display region R1, operates the decision button 214*e*. At that time, in the imaging apparatus 100, the control unit 310 sets the video format, such as "AVCHD", that is being displayed in the video format display region R1 by the display unit. Moreover, the control unit 310 sets the recording frame rate to "60 fps" (see (c) in FIG. 18).

Figure 19:
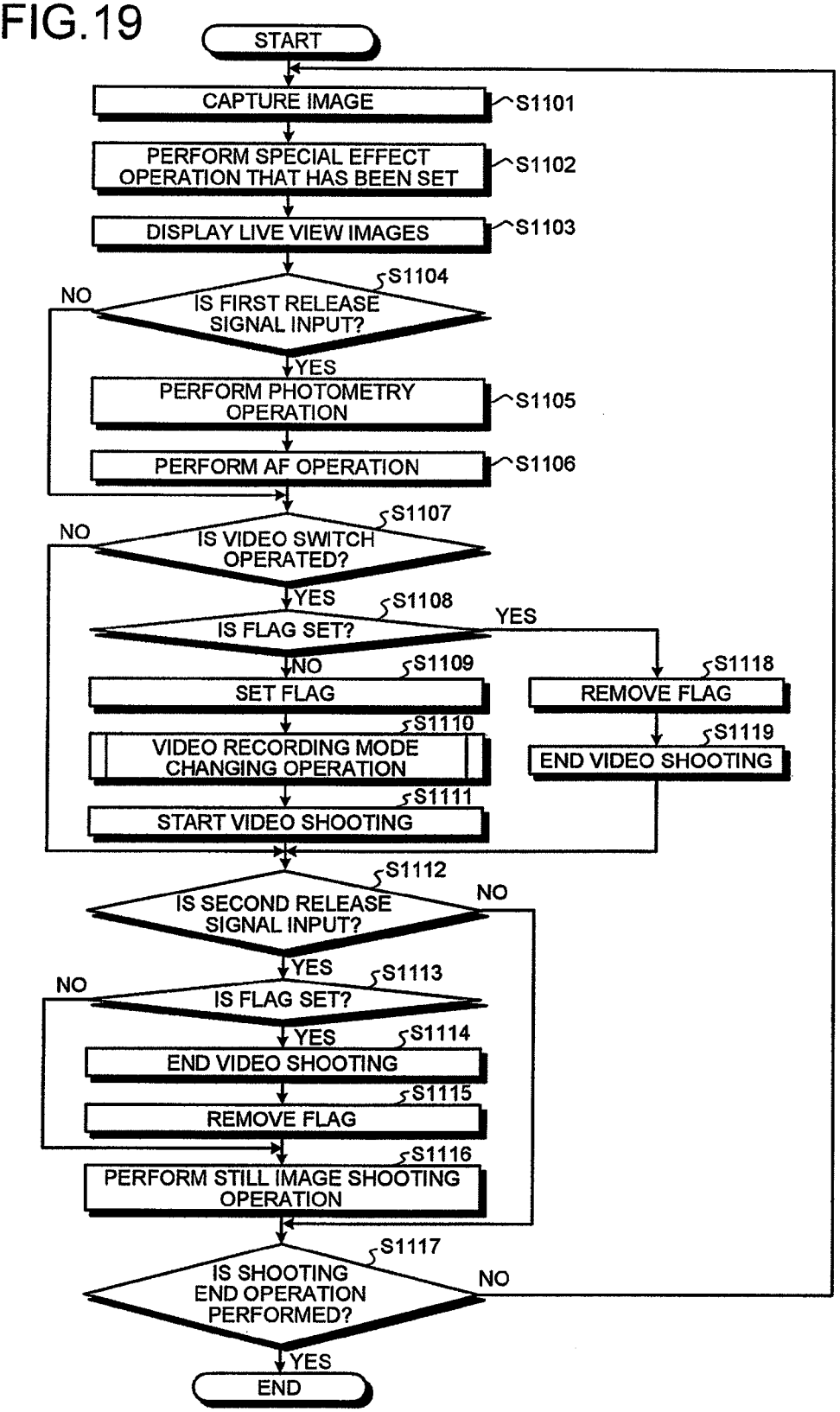
FIG. 19 is a flowchart for explaining in brief the operations performed in the special effect shooting mode by the imaging apparatus according to the fourth embodiment.

Given below is the explanation of the operations performed by the imaging apparatus 100 in which the special effect operation to be performed in the special effect shooting mode are set through the abovementioned stages. FIG. 19 is a flowchart for explaining in brief the operations performed by the imaging apparatus 100 in the special effect shooting mode.

As illustrated in FIG. 19, firstly, the imaging apparatus 100 starts capturing images of a photographic subject (Step S1101). More particularly, the imaging element 11 continuously generates image data at small time intervals and outputs the generated image data to the memory 13 via the A/D conversion unit 12.

Then, the control unit 310 instructs the image processing unit 14 to perform the special effect operation (Step S1102). More particularly, the image processing unit 14 obtains the image data stored in the memory 13; performs the special effect operation, which has been set by the special effect setting unit 311, on that image data; and outputs the processed image data to the memory 13. At that time, if a supplementary special effect is additionally set with respect to the special effect operation, the image processing unit 14 performs the supplementary special effect operation on the image data that has been subjected to the special effect operation.

Subsequently, the control unit 310 instructs the display unit 25 to display the live view images, which correspond to the image data that has been subjected to the special effect operation by the image processing unit 14, at a replaying frame rate of, for example, 15 fps corresponding to the special effect operation set by the special effect setting unit 311 (Step S1103). Then, the control unit 310 determines whether or not a first release signal has been input from the release switch 212 (Step S1104). If a first release signal is not yet input (No at Step S1104), then the system control proceeds to Step S1107 described later.

On the other hand, if a first release signal is input (Yes at Step S1104); then, based on the image data stored in the memory 13, the control unit 310 instructs the exposure processing unit 17 to perform a photometry operation for measuring the amount of light that is incident via the lens unit 3 (Step S1105) and instructs the AF processing unit 18 to perform an AF operation (Step S1106). More particularly, the AF processing unit 18 obtains the image data from the memory 13 via the control unit 310 and, based on the contrast in the obtained image data, drives the lens driving unit 42 of the lens unit 3 so as to move the lenses of the optical system 41 on the optical axis L for the purpose of adjusting the point of focus of the imaging apparatus 100.

When a video release signal instructing video shooting is input by means of an operation of the video switch 217 (Yes at Step S1107), the control unit 310 determines whether or not a flag indicating an operation of video recording being performed is set in the memory 13 (Step S1108). If the flag is not set in the memory 13 (No at Step S1108), the control unit 310 sets the flag in the memory 13 (Step S1109).

Subsequently, according to the special effect operation changed by the special effect setting unit 311, the video recording mode changing unit 312 performs a video recording mode changing operation for changing the video recording mode of the image data to be stored in the external memory 27 (Step S1110).

Then, using the video recording mode changed by the video recording mode changing unit 312, the imaging apparatus 100 starts video shooting in the external memory 27 (Step S1111).

If a second release signal is not yet input from the release switch 212 (No at Step S1112), then the system control proceeds to Step S1117 described later. On the other hand, when a second release signal is input (Yes at Step S1112), the control unit 310 determines whether or not a flag is set in the memory 13 (Step S1113). If a flag is not set in the memory 13 (No at Step S1113), then the system control proceeds to Step S1116 described later. On the other hand, if a flag is set in the memory 13 (Yes at Step S1113), then the imaging apparatus 100 ends video shooting (Step S1114) and the control unit 310 removes the flag that has been set in the memory 13 (Step S1115).

Subsequently, the imaging apparatus 100 performs a still image shooting operation in which the image data of the still images that have been subjected to the special effect operation by the image processing unit 14 is stored in the external memory 27 (Step S1116). Then, the imaging apparatus 100 determines whether or not an end operation for ending the shooting has been performed (Step S1117). More particularly, the imaging apparatus 100 determines whether or not a changeover signal instructing a changeover to another shooting mode has been input from the shooting mode changeover switch 213. If an end operation for ending the shooting is not input (No at Step S1117), then the system control returns to Step S1101. On the other hand, when an end operation for ending the shooting is input (Yes at Step S1117), the imaging apparatus 100 stops performing the operations.

Given below is the explanation regarding the case when a flag has been set in the memory 13 (Yes at S1108). In that case, the control unit 310 removes the flag set in the memory 13 (Step S1118) and the imaging apparatus 100 ends video shooting (Step S1119). Then, the system control proceeds to Step S1112.

If a video release signal instructing video shooting is not input by means of an operation of the video switch 217 (No at Step S1107), the system control proceeds to Step S1102.

Figure 20:
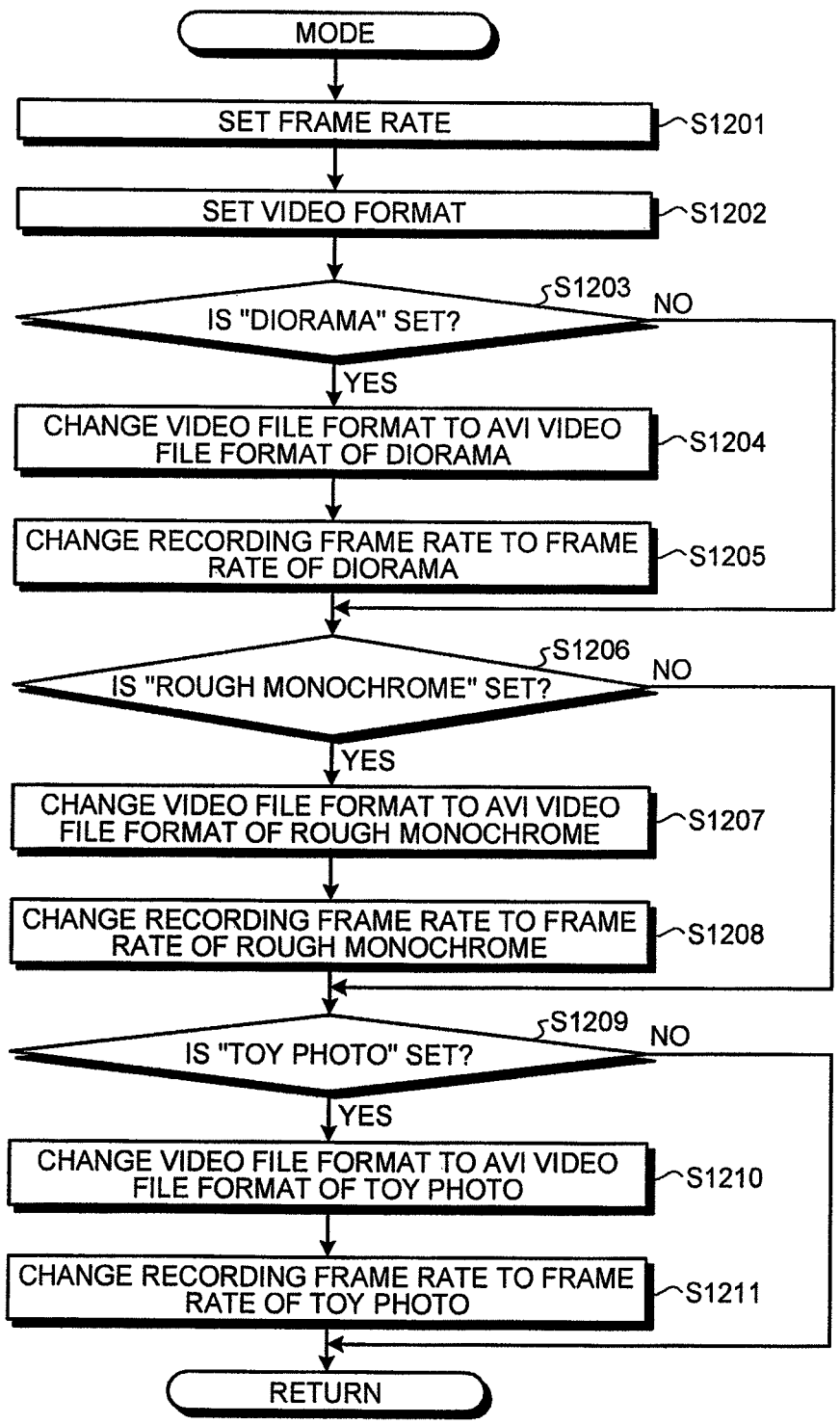
FIG. 20 is a flowchart for explaining in brief a video recording mode changing operation illustrated in FIG. 19.

Explained below is the video recording mode changing operation performed at Step S1110 illustrated in FIG. 19. FIG. 20 is a flowchart for explaining in brief the video recording mode changing operation illustrated in FIG. 19.

As illustrated in FIG. 20, firstly, depending on the recording frame rate of the image data that is set by the user in the video-file-format setting menu screen W132 (see FIG. 18), the control unit 310 sets the recording frame rate of the image data to be recorded in the external memory 27 (Step S1201). For example, when selection is made as illustrated in (c) in FIG. 18, the control unit 310 sets the recording frame rate of the image data to be recorded in the external memory 27 to 60 fps.

Then, depending on the video file format set by the user in the video-file-format setting menu screen W132, the control unit 310 sets the video file format of the video file in which the external memory 27 records the image data (Step S1202). For example, the control unit 310 sets "AVCHD" as the video file format of the video file in which the external memory 27 records the image data (see (c) in FIG. 18).

Subsequently, the control unit 310 determines whether or not "diorama" is set as the special effect operation in the image processing unit 14 by the special effect setting unit 311 (Step S1203). If "diorama" is not set as the special effect operation in the image processing unit 14 (No at Step S1203), then the system control proceeds to Step S1206 described later.

On the other hand, if "diorama" is set as the special effect operation in the image processing unit 14 (Yes at Step S1203), then the video recording mode changing unit 312 refers to the video-recording-mode information table T11 stored in the video-recording-mode information storing unit 264 and changes the video file format, in which the external memory 27 records the image data, to the AVI video file format of diorama (Step S1204). Moreover, the video recording mode changing unit 312 changes the recording frame rate, at which the external memory 27 records the image data, to the recording frame rate of 2 fps that is set for diorama (Step S1205).

While such changes are made in the video recording mode, the control unit 310 can instruct the display unit 25 to display a warning about the fact that, as part of the video recording mode, the video recording mode changing unit 312 is going to change the video file format of the video file. Moreover, when an instruction signal indicating a change in the video recording mode is input from the operation input unit 21, such as from the decision button 214e of the operation switch 214; the video recording mode changing unit 312 can be configured to change the video recording mode. As a result, while taking into account the intention of the user, the video recording mode changing unit 312 can change the video file format to the one that is suitable for the special effect operation performed by the image processing unit 14.

Then, the control unit 310 determines whether or not "rough monochrome" is set as the special effect operation in the image processing unit 14 by the special effect setting unit 311 (Step S1206). If "rough monochrome" is not set as the special effect operation in the image processing unit 14 (No at Step S1206), then the system control proceeds to Step S1209 described later.

On the other hand, if "rough monochrome" is set as the special effect operation in the image processing unit 14 (Yes at Step S1206), then the video recording mode changing unit 312 refers to the video-recording-mode information table T11 stored in the video-recording-mode information storing unit 264 and changes the video file format, in which the external memory 27 records the image data, from AVCHD to the AVI video file format of rough monochrome (Step S1207). Moreover, the video recording mode changing unit 312 changes the recording frame rate, at which the external memory 27 records the image data, to the recording frame rate of 6 fps that is set for rough monochrome (Step S1208).

Subsequently, the control unit 310 determines whether or not "toy photo" is set as the special effect operation in the image processing unit 14 by the special effect setting unit 311 (Step S1209). If "toy photo" is not set as the special effect operation in the image processing unit 14 (No at Step S1209), then the system control returns to the main routine illustrated in FIG. 19.

On the other hand, if "toy photo" is set as the special effect operation in the image processing unit 14 (Yes at Step S1209), then the video recording mode changing unit 312 refers to the video-recording-mode information table T11 stored in the video-recording-mode information storing unit 264 and changes the video file format, in which the external memory 27 records the image data, from AVCHD into the AVI video file format of toy photo (Step S1210).

Moreover, the video recording mode changing unit 312 changes the recording frame rate, at which the external memory 27 records the image data, to the recording frame rate of 15 fps that is set for toy photo (Step S1211). Then, the system control returns to the main routine illustrated in FIG. 19.

In the imaging apparatus 100 according to the fourth embodiment described above, in accordance with a setting instruction signal that is input from the operation input unit 21 and that provides an instruction regarding the settings contents of the special effect operation, the special effect setting unit 311 sets a special effect operation in the image processing unit 14. Then, depending on the special effects that are set in the image processing unit 14 by the special effect setting unit 311, the video recording mode changing unit 312 changes the video recording mode of the video data to be stored in the external memory 27. Thus, while performing video shooting, at the time of storing the image data that has been subjected to the special effect operation, it becomes possible to automatically set such a video recording mode which is suitable for that special effect operation. Moreover, while reproducing the image data that has been subjected to the special effect operation, it can be ensured that the artistic expression obtained by the special effects is not lost.

Meanwhile, in the fourth embodiment, depending on the special effects that are set in the image processing unit 14 by the special effect setting unit 311, the video recording mode changing unit 312 changes the video file format of the video files to AVI. However, alternatively, it is also possible to change the video file format to, for example, MP4.

Fifth Embodiment

Given below is the explanation of a fifth embodiment of the present invention. In the fourth embodiment described above, the explanation is given for the case in which the imaging apparatus is set to the special effect shooting mode. In contrast, in the fifth embodiment of the present invention, the explanation is given for the case in which the imaging apparatus performs the special effect operation in one of a plurality of manual setting shooting modes, which allow the user to manually perform advanced settings of shooting conditions.

Meanwhile, the imaging apparatus according to the fifth embodiment of the present invention has an identical configuration to the configuration of the imaging apparatus according to the fourth embodiment described earlier. Hence, the explanation of that configuration is not repeated.

Firstly, when the user operates the power ON/OFF switch 211 to switch ON the imaging apparatus 100, the control unit 310 determines whether or not the imaging apparatus 100 is set to any one of the manual setting shooting modes. More particularly, the control unit 310 determines whether the shooting mode changeover switch 213 is set to any one of the program shooting (P) mode, the aperture priority shooting (A) mode, the shutter priority shooting (S) mode, and the manual shooting (M) mode (see FIG. 1). If the shooting mode of the imaging apparatus 100 is set to any one of the P/A/S/M modes, then the control unit 310 instructs the display unit 25 to display live view images corresponding to the P/A/S/M modes.

Herein, in the program shooting (P) mode, the imaging apparatus 100 automatically sets the aperture value and the shutter speed. In the aperture priority shooting (A) mode, the user sets the aperture value and the imaging apparatus 100 automatically sets the shutter speed. In the shutter priority shooting (S) mode, the user sets the shutter speed and the imaging apparatus 100 automatically sets the aperture value. In the manual shooting (M) mode, the user sets the aperture value as well as the shutter speed.

Then, while the display unit 25 is displaying a live view image; if the user operates the menu switch 215, then the control unit 310 instructs the display unit 25 to display a customization menu screen.

Figure 21:
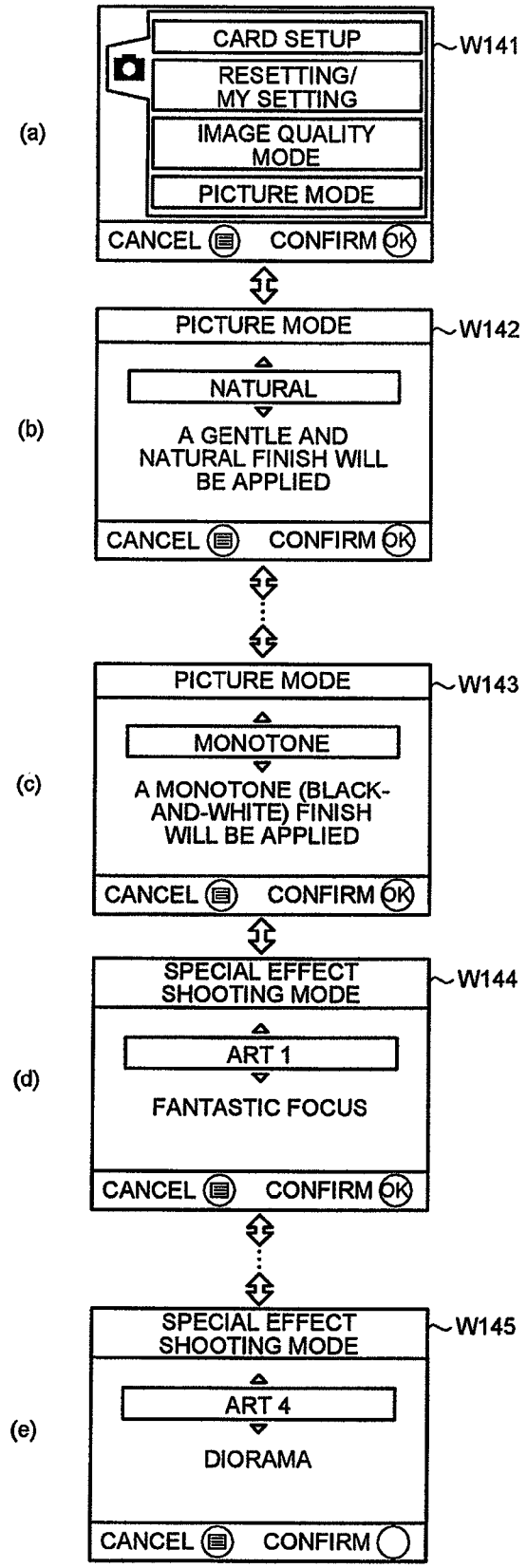
FIG. 21 is a diagram illustrating an example of transition of screens displayed by the display unit when the menu switch of the imaging apparatus according to a fifth embodiment of the present invention is operated.

FIG. 21 is a diagram illustrating an example of transition of screens displayed by the display unit 25 when the menu switch 215 of the imaging apparatus 100 is operated.

As illustrated in FIG. 21, when the imaging apparatus 100 is set to any one of the P/A/S/M modes, if the user operates the menu switch 215, the control unit 310 instructs the display unit 25 to display a customization menu screen W141 ((a) in FIG. 21). The customization menu screen W141 is a screen for changing various settings set in the imaging apparatus 100. For example, the customization menu screen W141 is a screen for changing the settings contents of the image quality mode or the picture mode.

Then, if the user operates the down button 214b of the operation switch 214 to select a picture mode and then presses the decision button 214e, the control unit 310 instructs the display unit 25 to display a picture mode setting screen W142 that is used in setting the contents of picture modes ((b) in FIG. 21). The picture mode setting screen W142 is a screen for selecting, from a plurality of picture modes each having the image processing set corresponding to a shooting scene, parameters such as color tone, color saturation, hue, contrast, and brightness with the aim of obtaining the optimum result depending on the shooting purpose or depending on the photographic subject. Moreover, on the picture mode setting screen W142, a supplementary message of the settings of the selected picture mode is also displayed.

Subsequently, while the display unit 25 is displaying the picture mode setting screen W142; if the user operates the down button 214b of the operation switch 214, then the control unit 310 instructs the display unit 25 to display a subsequent picture mode setting screen W143 ((c) in FIG. 21). Herein, in between the picture mode setting screen W142 and the picture mode setting screen W143, there exist a plurality of picture mode setting screens, and such picture mode setting screens are sequentially switched depending on the number of times for which the user operates the down button 214b of the operation switch 214.

Once the display unit 25 displays the picture mode setting screen W143; if the user operates the down button 214b of the operation switch 214, then the control unit 310 instructs the display unit 25 to display a special-effect-shooting setting screen W144 ((d) in FIG. 21). The special-effect-shooting setting screen W144 is used in selecting the special effect operation or the special supplementary image operation to be performed on the captured image data. While the display unit 25 is displaying the special-effect-shooting setting screen W144; if the user operates the down button 214b of the operation switch 214, then the control unit 310 instructs the display unit 25 to display a subsequent special-effect-shooting setting screen W145 ((e) in FIG. 21). Herein, in between the special-effect-shooting setting screen W144 and the special-effect-shooting setting screen W145, there exists a plurality of special-effect-shooting setting screens. The control unit 310 switches among such special-effect-shooting setting screens in response to the operation of the down button 214b of the operation switch 214 by the user. Thus, by operating the operation switch 214, the user can select the intended special-effect-shooting setting screen; and by operating the decision button 214e of the operation switch 214, the user can set the intended special effect operation, such as "diorama" ((e) in FIG. 21), in the imaging apparatus 100.

Given below is the explanation of the operations performed by the imaging apparatus 100 in which the special effect shooting mode is set to any one of the P/A/S/M modes through the abovementioned stages. FIG. 14 is a flowchart for explaining the operations performed by the imaging apparatus 1 in which the special effect shooting mode is set to any one of the P/A/S/M modes. In the fifth embodiment, by performing the same operations as described in the fourth embodiment, the video recording mode changing unit 312 changes the recording frame rate without changing the video file format, so as to store the image data in the external memory 27 in the AVCHD video file format. For that reason, in the fifth embodiment, the explanation is given for a recording method by which the video recording mode changing unit 312 records the image data, which has been subjected to the special effect operation by the image processing unit 14, in the external memory 27 in the AVCHD video file format. Meanwhile, in order to explain below in detail the recording method according to the fifth embodiment; firstly, the explanation is given regarding the conventional recording method for recording in the AVCHD video file format and regarding the conventional recording method for recording frame dropping videos. After that, the recording method according to the fifth embodiment is explained. Moreover, the explanation regarding the AVCHD video file format is given under the assumption that the recording frame rate is 30 fps.

Figure 22:
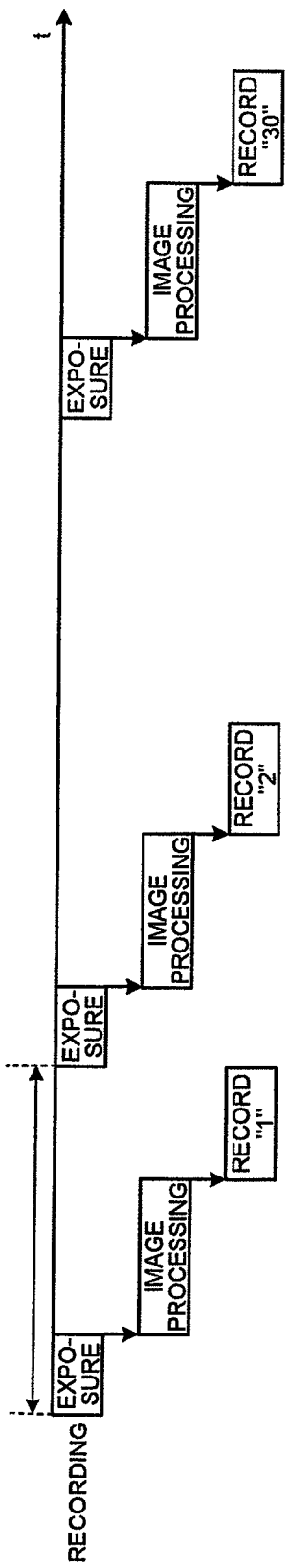
FIG. 22 is a time chart illustrating a conventional recording method for recoding image data obtained while performing video shooting in the AVCHD video file format.
Figure 23:
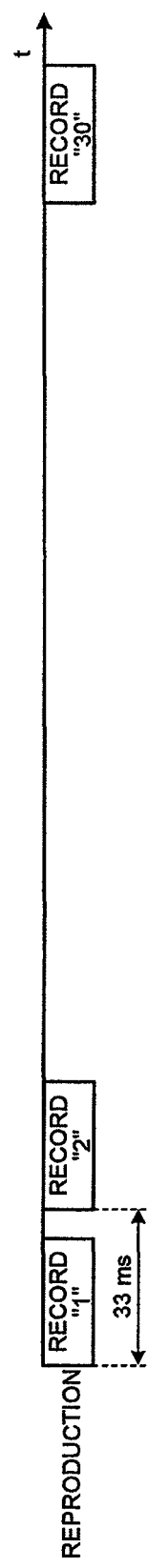
FIG. 23 is a time chart illustrating a reproducing method for reproducing the image data obtained by performing video shooting in the AVCHD video file format.

FIG. 22 is a time chart illustrating the conventional recording method for recoding image data obtained while performing video shooting in the AVCHD video file format. FIG. 23 is a time chart illustrating a reproducing method for reproducing the image data obtained by performing video shooting in the AVCHD video file format. Herein, the explanation with reference to FIG. 22 is given for the case when the video recording mode changing unit 312 stores, in the external memory 27, the image data that has been subjected to normal image processing by the image processing unit 14.

As illustrated in FIG. 22, the imaging apparatus 100 performs video shooting at exposure-start intervals of 33 ms. At such exposure intervals, the imaging element 11 generates image data and outputs it to the memory 13 via the A/D conversion unit 12. Subsequently, the image processing unit 14 obtains the image data from the memory 13, performs normal image processing on the obtained image data, and outputs the processed image data to the memory 13. Lastly, the video recording mode changing unit 312 obtains, from the memory 13, the image data that has been subjected to normal image processing by the image processing unit 14 and stores the obtained image data in the external memory 27 (record "1"). By repeating such operations, the video recording mode changing unit 312 can record the image data (records "1" to "30") generated while performing video shooting in the AVCHD video file format.

While reproducing and displaying the image data recorded in the external memory 27; as illustrated in FIG. 23, the video recording mode changing unit 312 instructs the display unit 25 to chronologically display the image data (records "1" to "30") that has been recorded in the external memory 27. Consequently, the image data can be reproduced at the same speed (one-fold) as the speed at the time of video shooting (FIG. 23).

FIG. 24 is a time chart illustrating the conventional recording method for recording image data at the time of shooting frame dropping videos in the AVCHD video file format. The explanation with reference to FIG. 24 is given for the case when the image generated at 7.5 fps by the imaging apparatus 1 is recorded in the external memory 27.

As illustrated in FIG. 24, the imaging apparatus 100 performs video shooting at exposure-start intervals of 132 ms. At such exposure intervals, the imaging element 11 generates image data and outputs it to the memory 13 via the A/D conversion unit 12. Subsequently, the image processing unit 14 obtains the image data from the memory 13, performs normal image processing on the obtained image data, and outputs the processed image data to the memory 13. Lastly, the video recording mode changing unit 312 obtains, from the memory 13, the image data that has been subjected to normal image processing by the image processing unit 14 and repeatedly stores the same image data for four times in the external memory 27 (records "1" to "4"). By repeating such operations, the imaging apparatus 100 can record, in the external memory 27, the image data (records "1" to "30") generated while performing frame-dropping video shooting in the AVCHD video file format.

While reproducing and displaying the image data that has been recorded in the external memory 27; as illustrated in FIG. 23, the video recording mode changing unit 312 instructs the display unit 25 to chronologically display the image data (records "1" to "30") that has been recorded in the external memory 27. Consequently, the image data can be reproduced at the same speed (30 fps÷7.5 fps÷4=1) as the speed at the time of video shooting.

FIG. 25 is a time chart illustrating the recording method of recording image data that has been subjected to the special effect operation by the image processing unit 14 at the time of performing video shooting in the AVCHD video file format according to the fifth embodiment. Herein, the explanation is given for the case in which the imaging apparatus 100 records, in the external memory 27, the image data that is generated when the special effect shooting mode is set to "diorama" (2 fps (see FIG. 21)).

As illustrated in FIG. 25, the imaging apparatus 100 performs video shooting at exposure-start intervals of 500 ms. At such exposure intervals, the imaging element 11 generates image data and outputs it to the memory 13 via the A/D conversion unit 12. Subsequently, the image processing unit 14 obtains the image data from the memory 13, performs the special effect operation on the obtained image data, and outputs the processed image data to the memory 13. Lastly, the video recording mode changing unit 312 obtains, from the memory 13, the image data that has been subjected to the special effect operation by the image processing unit 14 and repeatedly stores the same image data twice in the external memory 27 (records "1" and "2"). Then, until the subsequent exposure is completed, the video recording mode changing unit 312 stops recording the image data in the external memory 27 (FIG. 25). By repeating such operations, the imaging apparatus 100 can record the image data (records "1" to "30") that has been subjected to the special effect operation by the image processing unit 14 while performing video shooting in the AVCHD video file format.

While reproducing and displaying the image data recorded in the external memory 27; as illustrated in FIG. 23, the imaging apparatus 100 instructs the display unit 25 to chronologically display the image data (records "1" to "30") that has been recorded in the external memory 27. Consequently, the image data can be reproduced at a higher reproduction speed (30 fps÷2 fps÷2=7.5) than the reproduction speed at the time of normal video shooting.

According to the fifth embodiment, depending on the special effect operation set in the image processing unit 14 by the special effect setting unit 311, the video recording mode changing unit 312 changes the recording frame rate of the image data to be recorded in the external memory 27. Hence, even if the video file format is AVCHD, the image data that has been subjected to the special effect operation can be recorded in the external memory 27. As a result, while continuously reproducing the image data that has been subjected to the special effect operation by the image processing unit 14, the special effects can be prevented from being lost.

Moreover, in the fifth embodiment, the video recording mode changing unit 312 twice records the image data, which has been subjected to the special effect operation by the image processing unit 14, in the external memory 27 and then stops recording the image data in the external memory 27 until the subsequent exposure is completed. Alternatively, for example, after the image data is once recorded in the external memory 27, the recording can be stopped for a predetermined amount of time and then the same image data can be again recorded in the external memory 27. Still alternatively, instead of repeatedly recording the same image data for a plurality of number of times, the image data can be recorded only once and a command issuing repetition of the corresponding frames can also be recorded.

Furthermore, in the fifth embodiment, the video recording mode changing unit 312 can also be configured to instruct the image processing unit 14 to generate a plurality of sets of image data that that been subjected to the special effect operation; to obtain only two sets of image data from among the plurality of sets of image data; to store the two sets of image data in the external memory 27, and to destroy the other sets of image data. That enables achieving the same advantages as achieved in the fourth embodiment described above.

Moreover, in the fifth embodiment, the video recording mode changing unit 312 changes the recording frame rate after the image processing unit 14 performs the special effect operation. Alternatively, for example, the video recording mode changing unit 312 can be configured to change the recording frame rate before the image processing unit 14 performs the special effect operation. More particularly, in order to change the recording frame rate, the video recording mode changing unit 312 can be configured to change the time interval at which the image processing unit 14 obtains the image data from the memory 13.

Furthermore, in the fifth embodiment, the video recording mode changing unit 312 can be configured to instruct the image processing unit 14 to synthesize the image data generated during the current exposure and the image data generated during the subsequent exposure; and to record, in the external memory 27, the synthesized image data as the image data in between the current exposure and the subsequent exposure.

Other Embodiments

In the embodiments described above, an external processing apparatus such as a personal computer or a server can be connected via the external communication unit, and the control unit can be configured to refer to the information received via the external communication unit and to accordingly update or overwrite a variety of information that is stored in the shooting-mode-information storing unit, the special-effect-operation information storing unit, and the supplementary-special-effect-operation information storing unit. That enables the control unit to carry out the shooting by using a combination of newly-added shooting modes, special effects, and supplementary special effects. Moreover, the special effect operation information or the supplementary special effect operation information can be stored in the external memory, and the control unit can be configured to obtain such information from the external memory and to accordingly update or change a variety of information that is stored in the special-effect-operation information storing unit and the supplementary-special-effect-operation information storing unit.

Moreover, in the embodiments described above, although the explanation is given regarding the display frame rate of the live view images displayed by the display unit; the present invention can also be implemented in, for example, an external electronic viewfinder that can be detachably attached to the main body.

Furthermore, in the embodiments described above, although the explanation is given regarding the display frame rate of the live view images displayed by the display unit; the present invention can also be implemented in, for example, an electronic viewfinder that is installed on the main body separately from the display unit.

Moreover, in the embodiments described above, a single image processing unit is disposed. Alternatively, for example, two image processing units can be disposed and the operations can be switched among the two image processing units so as to switch between the first-type special effect operation and the second-type special effect operation.

Furthermore, in the embodiments described above, the display unit can be configured to have a touch-sensitive panel installed on the display screen so that, when the user touches the touch-sensitive panel, the control unit instructs the image processing unit to switch the special effect operation between the first-type special effect operation and the second-type special effect operation.

Moreover, in the embodiments described above, the lens unit is detachably attached to the main body. Alternatively, the lens unit can be installed in an integrated manner with the main body.

Furthermore, in the embodiments described above, although the explanation is given under the assumption that the imaging apparatus is a digital single-lens reflex camera, the present invention is also applicable to various electronic devices having the shooting function and the display function. For example, the present invention is also applicable to a digital camera having the lens unit and the main unit installed in an integrated manner, applicable to a digital video camera, or applicable to a cellular phone equipped with a camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus, comprising:
an imaging unit that captures images of a photographic subject and continuously generates electronic image data;
a display unit that displays, at a predetermined display frame rate, images corresponding to the image data generated by the imaging unit;
an image processing unit that either performs, with respect to the image data, a first-type special effect operation or a second-type special effect operation, the images, of which image data is subjected to the first-type special effect operation, being able to be displayed at the predetermined display frame rate, the images, of which image data is subjected to the second-type special effect operation being able to be displayed at a faster display frame rate than the predetermined display frame rate;
an operation input unit that receives input of a change instruction signal that provides an instruction for changing a combination of image processing operations during the first-type special effect operation or the second-type special effect operation performed by the image processing unit; and
a control unit that, when an input of the change instruction signal is received by the operation input unit, instructs the image processing unit to switch the special effect operation from the first-type special effect operation to the second-type special effect operation;
wherein, while the display unit is displaying the images, if an input of the change instruction signal is received by the operation input unit, the control unit instructs the image processing unit to switch the special effect operation from the first-type special effect operation to the second-type special effect operation; and
the time required for image processing operations during the second-type special effect operation is shorter the time required for image processing operations during the first-type special effect operation.

2. The imaging apparatus according to claim 1, wherein, the first-type special effect operation and the second-type special effect operation produce special effects in the images by a combination of a plurality of image processing operations.

3. The imaging apparatus according to claim 2, wherein the second-type special effect operation includes an image processing operation of changing one or more parameters from among white balance, color saturation, hue, contrast, and brightness.

4. The imaging apparatus according to claim 3, wherein
with respect to the image data that have been subjected to either one of the first-type special effect operation and the second-type special effect operation, the image processing unit either performs a first-type supplementary special effect operation which adds different image processing operations or a second-type supplementary special effect operation which adds different image processing operations, the images, of which image data is subjected to the first-type supplementary special effect operation, being able to be displayed at the predetermined display frame rate, the images, of which image data is subjected to the second-type supplementary special effect operation, being able to be displayed at the faster display frame rate, and when the change instruction signal is input, the control unit instructs the image processing unit to switch the supplementary special effect operation from the first-type supplementary special effect operation to the second-type supplementary special effect operation.

5. The imaging apparatus according to claim 4, further comprising a timer that measures time, wherein when the change instruction signal is input, the control unit instructs the timer to start measuring time and, until a predetermined time is reached, instructs the image processing unit to perform only the second-type special effect operation as the special effect operation.

6. The imaging apparatus according to claim 5, wherein the operation input unit includes a release switch that is configured to be protrudable/retractable in response to an external pressing force, and when the release switch is half-pressed, the operation input unit receives input of at least the change instruction signal that provides an instruction regarding a shooting preparation operation; and when the release switch is fully pressed, the operation input unit receives input of at least an instruction signal that provides an instruction for still image shooting.

7. The imaging apparatus according to claim 5, wherein the operation input unit includes a preview switch for receiving input of an instruction signal that provides an instruction to the display unit for displaying still images corresponding to the image data generated by the imaging unit, and when the preview switch is operated while the imaging apparatus is performing shooting, the control unit receives the instruction signal as the change instruction signal.

8. The imaging apparatus according to claim 5, wherein the imaging unit includes a lens unit that collects light from a predetermined field of vision and performs optical zooming for changing the angle of view, the lens unit includes a lens operating unit that receives input of an instruction signal that provides an instruction for changing the angle and/or the point of focus of the lens unit; and a lens control unit that controls the operation of the lens unit according to the instruction signal received by the lens operating unit, and when the lens operating unit is operated, the control unit receives at least the instruction signal as the change instruction signal.

9. The imaging apparatus according to claim 1, further comprising a recording unit that is used in storing the image data that has been subjected to a special effect operation by the image processing unit in a predetermined video recording mode, wherein the control unit includes a special effect setting unit that sets a special effect operation according to a setting instruction signal that is input via the operation input unit; and a video recording mode changing unit that, depending on the special effect operation set by the special effect setting unit in the image processing unit, changes the video recording mode of the image data to be stored in the recording unit.

10. The imaging apparatus according to claim 9, wherein the video recording mode is a video file format of a file for determining the recording format of a video.

11. An imaging apparatus, comprising:

an imaging unit that captures images of a photographic subject and continuously generates electronic image data;

a display unit that displays, at a predetermined display frame rate, images corresponding to the image data generated by the imaging unit;

an image processing unit that either performs, with respect to the image data, a first-type special effect operation or a second-type special effect operation, the images, of which image data is subjected to the first-type special effect operation, being able to be displayed at the predetermined display frame rate, the images, of which image data is subjected to the second-type special effect operation being able to be displayed at a faster display frame rate than the predetermined display frame rate;

an operation input unit that receives input of a change instruction signal that provides an instruction for changing a combination of image processing operations during the first-type special effect operation or the second-type special effect operation performed by the image processing unit;

a control unit that, when an input of the change instruction signal is received by the operation input unit, instructs the image processing unit to switch the special effect operation from the first-type special effect operation to the second-type special effect operation;

a recording unit that is used in storing the image data that has been subjected to the special effect operation by the image processing unit in a predetermined video recording mode;

the control unit further includes:

a special effect setting unit that sets the special effect operation according to a setting instruction signal that is input via the operation input unit; and a video recording mode changing unit that, depending on the special effect operation set by the special effect setting unit in the image processing unit, changes the video recording mode of the image data to be stored in the recording unit, wherein the video recording mode is a video file format of a file for determining the recording format of a video; and a video-recording-mode storing unit that is used in storing a video-recording-mode information table containing combinations of the special effect operation and the video file format, wherein the video recording mode changing unit refers to the video-recording-mode information table and changes the video file format.

12. The imaging apparatus according to claim 11, wherein the video recording mode points to a recording frame rate at which the image data is to be recorded.

13. The imaging apparatus according to claim 12, wherein the video recording mode changing unit changes the recording frame rate after the image processing unit has performed a special effect operation.

14. The imaging apparatus according to claim 12, wherein the video recording mode changing unit changes the recording frame rate before the image processing unit performs a special effect operation.

15. An imaging method implemented in an imaging apparatus that captures images of a photographic subject and continuously generates electronic image data, that is capable of displaying, at a predetermined display frame rate, images corresponding to the image data generated by the imaging apparatus, and that is capable of performing a plurality of special effect operations in which special effects are produced in the images by a combination of a plurality of image processing operations, the imaging method comprising:

receiving input of a change instruction signal that provides an instruction for changing a combination of image processing operations during the special effect operations; and switching, in response to receiving an input of the change instruction signal, the special effect operation from a first-type special effect operation to a second-type special effect operation, the images, of which image data is subjected to the first-type special effect operation, being able to be displayed at the predetermined display frame rate, the images, of which image data is subjected to the second-type special effect operation, being able to be displayed at a faster display frame rate than the predetermined display frame rate;

wherein the time required for image processing operations during the second-type special effect operation is shorter the time required for image processing operations during the first-type special effect operation.

16. A non-transitory computer-readable storage medium with an executable program stored thereon, wherein the program instructs a processor, which captures images of a photographic subject and continuously generates electronic image data, which is capable of displaying, at a predetermined display frame rate, images corresponding to the image data generated by an imaging unit, and which is capable of performing a plurality of special effect operations in which special effects are produced in the images by a combination of a plurality of image processing operations, to perform:

receiving input of a change instruction signal that provides an instruction for changing a combination of image processing operations during the special effect operation; and switching, in response to receiving an input of the change instruction signal, the special effect operation from a first-type special effect operation to a second-type special effect operation, the images, of which image data is subjected to the first-type special effect operation, being able to be displayed at the predetermined display frame rate, the images, of which image data is subjected to the second-type special effect operation, being able to be displayed at a faster display frame rate than the predetermined display frame rate wherein, the time required for image processing operations during the second-type special effect operation is shorter the time required for image processing operations during the first-type special effect operation.

17. An imaging method implemented in an imaging apparatus that captures images of a photographic subject and continuously generates electronic image data, that is capable of displaying, at a predetermined display frame rate, images corresponding to the image data generated by the imaging apparatus, and that is capable of performing a plurality of special effect operations in which special effects are produced in the images by a combination of a plurality of image processing operations, the imaging method comprising:

performing a first-type special effect operation or a second-type special effect operation on the image data, the images, of which image data is subjected to the first-type special effect operation, being able to be displayed at the predetermined display frame rate, the images, of which image data is subjected to the second-type special effect operation being able to be displayed at a faster display frame rate than the predetermined display frame rate;

recording in a chronological order the image data that has been subjected to the special effect operation in a predetermined video recording mode;

receiving input of a setting instruction signal giving an instruction about settings contents of the special effect operation;

setting the special effect operation according to the setting instruction signal;

changing, depending on the special effect operation, the video recording mode of the image data to be recorded, wherein the video recording mode is a video file format of a file for determining the recording format of a video;

storing a video-recording-mode information table containing combinations of the special effect operation and the video file format, and referring to the video-recording-mode information table and changing the video file format.

18. A non-transitory computer-readable storage medium with an executable program stored thereon, wherein the program instructs a processor, which captures images of a photographic subject and continuously generates electronic image data, which is capable of displaying, at a predetermined display frame rate, images corresponding to the image data generated by the imaging apparatus, and which is capable of performing a plurality of special effect operations in which special effects are produced in the images by a combination of a plurality of image processing operations to perform:

performing a first-type special effect operation or a second-type special effect operation on the image data, the images, of which image data is subjected to the first-type special effect operation, being able to be displayed at the predetermined display frame rate, the images, of which image data is subjected to the second-type special effect operation being able to be displayed at a faster display frame rate than the predetermined display frame rate;

recording in a chronological order the image data that has been subjected to the special effect operation in a predetermined video recording mode;

receiving input of a setting instruction signal giving an instruction about settings contents of the special effect operation;

setting the special effect operation according to the setting instruction signal;

changing, depending on the special effect operation, the video recording mode of the image data to be recorded, wherein the video recording mode is a video file format of a file for determining the recording format of a video;

storing a video-recording-mode information table containing combinations of the special effect operation and the video file format, and referring to the video-recording-mode information table and changing the video file format.

\* \* \* \* \*